(12) United States Patent
Herget et al.

(10) Patent No.: US 12,168,405 B2
(45) Date of Patent: Dec. 17, 2024

(54) SEAT BACK FRAME ASSEMBLIES AND SEAT ASSEMBLIES INCLUDING PULTRUSION REINFORCEMENTS

(71) Applicants: Toyota Motor Engineering & Manufacturing North America, Inc., Plano, TX (US); BASF SE, Ludwigshafen am Rhein (DE); FLEX-N-GATE ADVANCED PRODUCT DEVELOPMENT, LLC, Warren, MI (US)

(72) Inventors: Jacob A. Herget, Ypsilanti, MI (US); John Salvia, Ann Arbor, MI (US); Todd Rupert Muck, Fowlerville, MI (US); Vikas Bhatia, South Lyon, MI (US); Gregory T. Donovan, Britton, MI (US); Matthew F. Parkinson, Wyandotte, MI (US); Steven R. Perucca, Clinton Twp, MI (US)

(73) Assignees: Toyota Motor Engineering & Manufacturing North America, Inc., Plano, TX (US); BASF SE, Wyandotte, MI (US); Flex-N-Gate Advanced Product Development, LLC, Warren, MI (US)

( * ) Notice: Subject to any disclaimer, the term of this patent is extended or adjusted under 35 U.S.C. 154(b) by 0 days.

(21) Appl. No.: 17/571,147

(22) Filed: Jan. 7, 2022

(65) Prior Publication Data
US 2023/0219473 A1 Jul. 13, 2023

(51) Int. Cl.
*B60N 2/68* (2006.01)
*B60N 2/225* (2006.01)
*B60N 2/02* (2006.01)

(52) U.S. Cl.
CPC .......... *B60N 2/682* (2013.01); *B60N 2/2252* (2013.01); *B60N 2/686* (2013.01); *B60N 2/02258* (2023.08)

(58) Field of Classification Search
CPC .............................. B60N 2/682; B60N 2/686
See application file for complete search history.

(56) References Cited

U.S. PATENT DOCUMENTS

| 6,739,673 B2 | 5/2004 | Gupta et al. |
| 7,300,102 B2 | 11/2007 | Gupta et al. |

(Continued)

FOREIGN PATENT DOCUMENTS

| DE | 10161082 A1 * | 7/2003 | |
| DE | 202009017479 U1 * | 4/2010 | ............... B60N 2/68 |

(Continued)

OTHER PUBLICATIONS

Ginger Gardiner, Skeleton design enables more competitive composite autostructures, www.CompositesWorld.com, (https://www.compositesworld.com/blog/post/skeleton-designenables-more-competitive-composite-autostructures); Apr. 8, 2019.

(Continued)

*Primary Examiner* — Timothy J Brindley
(74) *Attorney, Agent, or Firm* — Dinsmore & Shohl LLP

(57) ABSTRACT

A seat back assembly including a pultrusion reinforcement and a seat back frame formed of a resin material, the seat back frame is only partially overmolded onto the pultrusion reinforcement such that the pultrusion reinforcement is configured to be visually inspected through a plurality of openings formed in the seat back frame.

16 Claims, 10 Drawing Sheets

(56) References Cited

U.S. PATENT DOCUMENTS

| | | | |
|---|---|---|---|
| 8,985,695 B2 | 3/2015 | Baumgarten | |
| 9,676,311 B2 | 6/2017 | Murolo et al. | |
| 9,676,338 B2 * | 6/2017 | Chapman | B60N 2/68 |
| 10,124,899 B2 * | 11/2018 | Mansouri | B64D 11/06 |
| 10,343,780 B2 * | 7/2019 | Portoles | B64D 11/0649 |
| 2017/0174153 A1 * | 6/2017 | Line | B60N 2/682 |
| 2017/0239872 A1 | 8/2017 | Chapman et al. | |
| 2020/0247271 A1 * | 8/2020 | Onuma | B60N 2/686 |
| 2022/0227275 A1 * | 7/2022 | Line | B60N 2/28 |
| 2023/0132930 A1 * | 5/2023 | Kirzhner | B60N 2/686 297/230.1 |

FOREIGN PATENT DOCUMENTS

| | | | | |
|---|---|---|---|---|
| DE | 102010051180 A1 | | 5/2011 | |
| DE | 102011120529 A1 | * | 6/2013 | |
| DE | 102015113507 A1 | * | 2/2017 | |
| DE | 102019207585 A1 | * | 11/2020 | |
| EP | 2199148 A1 | * | 6/2010 | B60N 2/682 |
| EP | 2384925 A1 | * | 11/2011 | |
| EP | 2612794 A | | 10/2013 | |
| EP | 4029730 A1 | * | 7/2022 | |
| JP | 2012-250596 A | | 12/2012 | |
| KR | 100487993 B1 | | 5/2005 | |
| KR | 101759207 B1 | | 7/2017 | |
| WO | WO-2012032189 A1 | * | 3/2012 | |

OTHER PUBLICATIONS

Ginger Gardiner, Camisma's car seat back: hybrid composite for high volume, www.CompositesWorld.com, (https://www.compositesworld.com/articles/camismas-car-seatback-hybrid-composite-for-high-volume); Nov. 29, 2014.

* cited by examiner

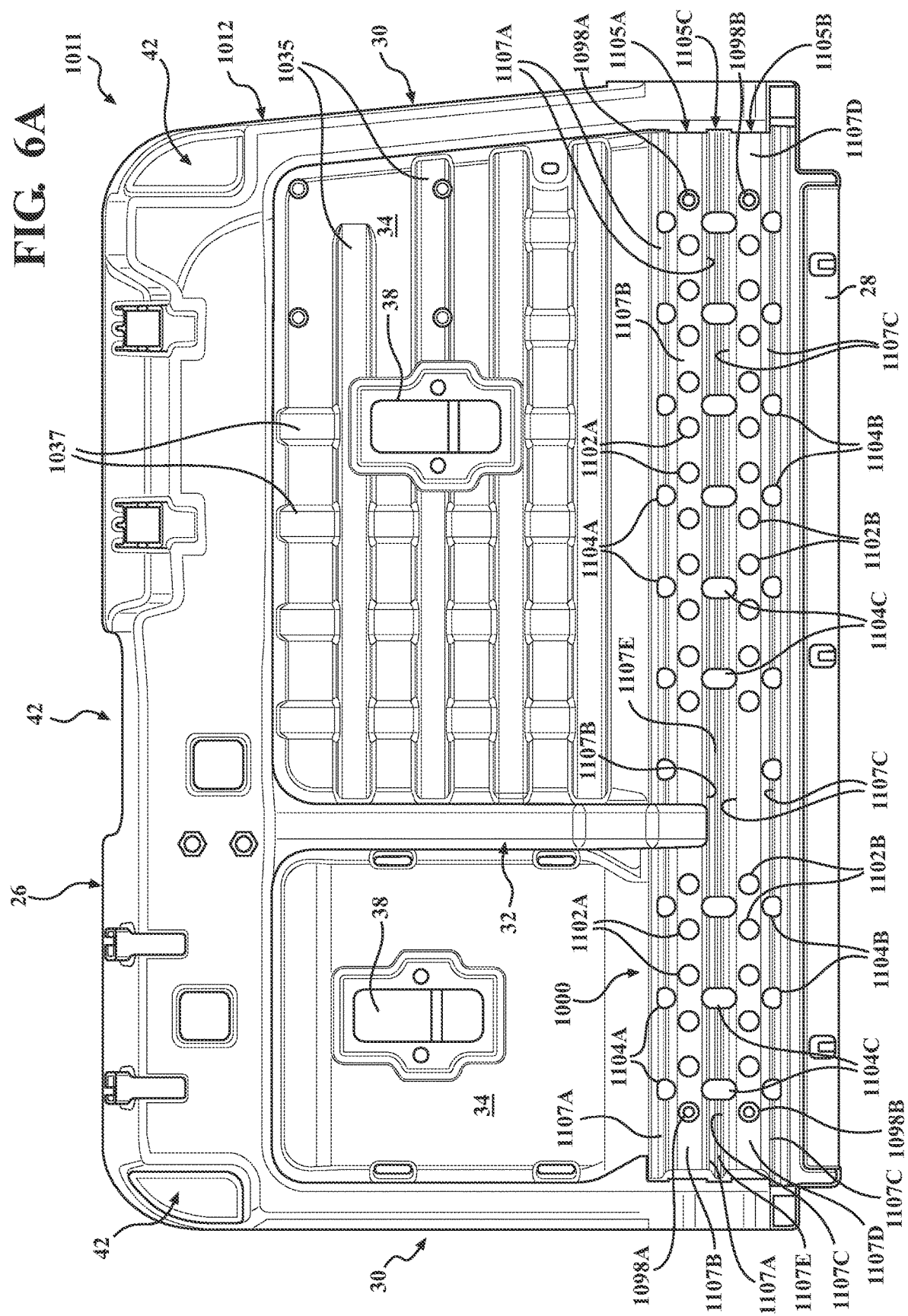

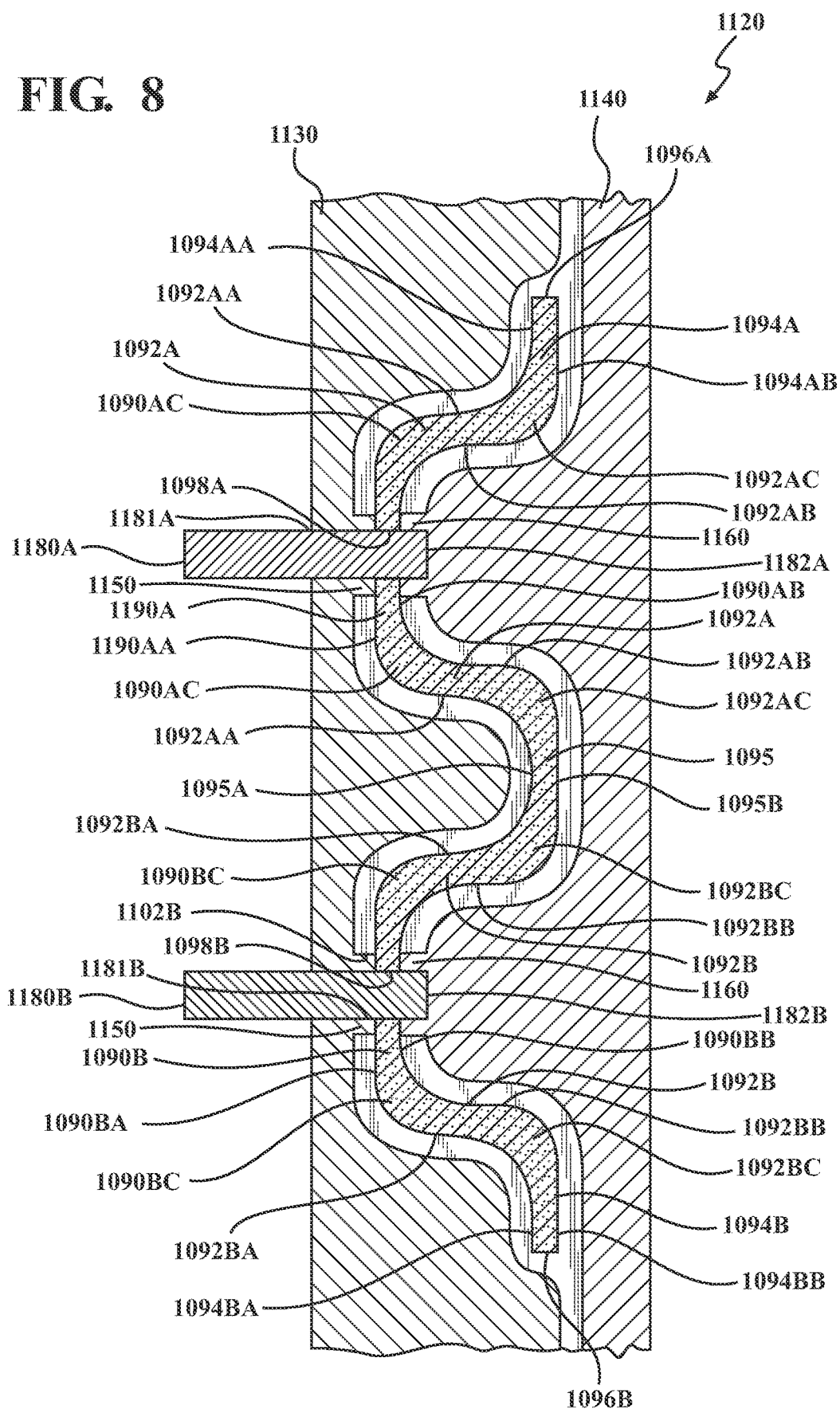

SEAT BACK FRAME ASSEMBLIES AND SEAT ASSEMBLIES INCLUDING PULTRUSION REINFORCEMENTS

TECHNICAL FIELD

The present specification generally relates to seat back frame assemblies for a vehicle and, more particularly, seat back frame assemblies having seat back frames and a pultrusion reinforcement.

BACKGROUND

Vehicles may include seat assemblies with a stadium style seat that is moveable between a use position and a tip-up position. Previously known seat assemblies may include metal or resin frames. When resin frames are incorporated into the seat assemblies, a seat back frame of the seat assembly may include a reinforced member to improve the strength of the seat back frame.

The resin frame of the seat assembly may be formed using an overmold process. However, previous overmold processes often exert a large amount of pressure on the reinforcement member, thereby damaging the reinforcement member or misaligning the reinforcement member within the overmold portion. Moreover, it may be difficult to determine whether the reinforcement member is damaged or misaligned, as the overmold portion covers the reinforcement member during the overmold process.

Accordingly, a need exists for alternative seat back frames which reduces an amount of pressure applied to the reinforcement member during the overmold process and enables visual inspection of the reinforcement after completion of the overmold process.

SUMMARY

In one embodiment, a seat back assembly includes a pultrusion reinforcement and a seat back frame. The seat back frame is formed of a resin material. The seat back frame is only partially overmolded into the pultrusion reinforcement such that the pultrusion reinforcement is configured to be visually inspect through a plurality of openings formed in the seat back frame.

In another embodiment, a seat assembly includes a seat cushion frame, a pultrusion reinforcement, and a seat back frame. The seat back frame is formed of a resin material. The seat back frame is only partially overmolded into the pultrusion reinforcement such that the pultrusion reinforcement is configured to be visually inspect through a plurality of openings formed in the seat back frame.

In another embodiment, a method includes providing a pultrusion reinforcement, overmolding a seat back frame onto the pultrusion reinforcement, and forming a plurality of openings in the seat back frame. The plurality of openings are formed when overmolding the seat back frame onto the pultrusion reinforcement such that the pultrusion reinforcement is configured to be visually inspected through the plurality of openings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A schematically depicts a front view of a seat back frame of the seat back assembly of FIG. 5 according to one or more embodiments shown and described herein;

FIG. 8 schematically depicts a partial cross-sectional view of a molding apparatus for the seat back frame of FIG. 5 according to one or more embodiments shown and described herein.

DETAILED DESCRIPTION

A seat back assembly according to the present specification includes a pultrusion reinforcement and a seat back frame. The seat back frame is formed of a resin material. The seat back frame is only partially overmolded onto the pultrusion reinforcement. The pultrusion reinforcement is configured to be visually inspected through a plurality of openings formed in the seat back frame. By only partially overmolding the seat back frame onto the pultrusion reinforcement, an amount of pressure applied to the pultrusion reinforcement during the overmold process is reduced. Furthermore, by configuring the pultrusion reinforcement to be visually inspected through the plurality of openings formed in the seat back frame, allows an operator to verify that the pultrusion reinforcement is properly positioned and undamaged upon completion of the overmold process.

A seat assembly according to the present specification includes a seat back frame, a pultrusion reinforcement, and a seat cushion frame pivotally coupled to the seat back frame. The seat back frame is formed of a resin material. The seat back frame is only partially overmolded onto the pultrusion reinforcement. The pultrusion reinforcement is configured to be visually inspected through a plurality of openings formed in the seat back frame. Various embodiments will be described in more detail herein.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/− vehicle Z-direction as depicted), and is transverse to the vehicle longitudinal direction. The term "vehicle vertical direction" refers to the upward-downward direction of the vehicle (i.e., in the +/−vehicle Y-direction as depicted). Further, the terms "upward," "downward," "rearward," and "forward" are used to describe the relative positioning of various components of the vehicle relative to one another. Because the vehicle structures may be generally symmetrical about the vehicle centerline, the terms "upward," "downward," "rearward," and "forward" may be switched when evaluating components positioned along opposite sides of the vehicle. Further, while certain components of the vehicle are described as extending in one of the identified directions or oriented toward one of the identified directions, it should be understood that these components extend or are oriented in at least these recited directions.

Figure 1:
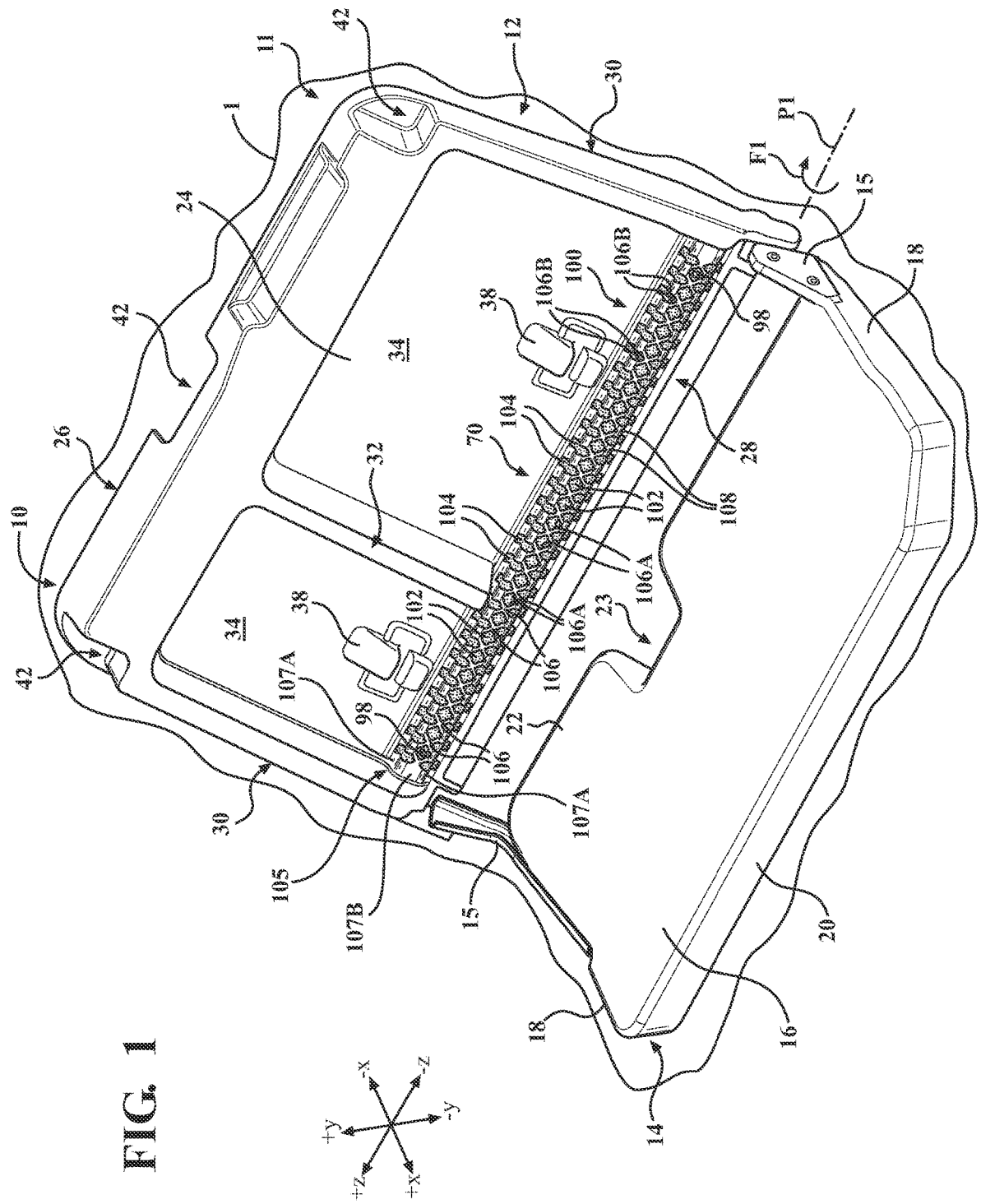
FIG. 1 schematically depicts a perspective view of a vehicle including a seat assembly according to one or more embodiments shown and described herein.

Referring now to FIG. 1, a seat assembly 10 is generally depicted. In some embodiments, the seat assembly 10 is provided within a vehicle 1, which may be a car in some embodiments. In other embodiments, the vehicle 1 may be a truck, a sport utility vehicle, a van, a boat, a plane, or other vehicle types.

The vehicle 1 includes a passenger compartment in which the seat assembly 10 positioned therein for seating occupants within the vehicle 1. While one seat assembly 10 is illustrated in FIG. 1, it should be understood that the vehicle 1 may include any number of seat assemblies 10 in other embodiments.

In the illustrated embodiment, the seat assembly 10 is configured as a rear seat of the vehicle 1. As a non-limiting example, the rear seat of the vehicle 1 may be a rear 60/40 seat that includes the seat assembly 10 and a second seat assembly (not shown). Accordingly, the seat assembly 10 may be configured as the "60" seat to support an occupant on an outer portion and in an inner portion of the seat assembly 10 in the vehicle lateral direction (i.e., in the +/−Z-direction of the coordinate axes shown in the figures). It should be understood that in other embodiments, the seat assembly 10 may be a "50/50" seat, a captain type seat, a bucket type seat, or other various seat assemblies.

The seat assembly 10 includes a seat back assembly 11 and a seat cushion frame 14. The seat back assembly 11 includes a seat back frame 12 and a pultrusion reinforcement 70. As will be described in in greater detail below, the pultrusion reinforcement 70 is only partially overmolded within the seat back frame 12 such that the pultrusion reinforcement 70 is configured to be visually inspected through the seat back frame 12. The seat back frame 12 and the seat cushion frame 14 may be coupled to each other via a pair of brackets 15. The brackets 15 may couple the seat back frame 12 and the seat cushion frame 14 using a fastener.

In some embodiments, the seat cushion frame 14 may be pivotally coupled to the seat cushion frame 14 via the brackets 15 for movement about a pivot axis P1. In some embodiments, the seat cushion frame 14 may be pivotal between a seated position and a tip-up position. In the seated position, the seat cushion frame 14 is positioned to support an occupant above a floor of the vehicle 1. In the tip-up position, the seat cushion frame 14 is pivoted about the pivot axis P1 in the direction of arrow F1 towards the seat back frame 12. In the tip-up position, the seat cushion frame 14 faces the seat back frame 12.

In some embodiments, the seat assembly 10 may include one or more attachment points (not shown) for securely fastening the seat assembly 10 to a floor of the vehicle 1. In some other embodiments, the seat assembly 10 may be slidably attached to the floor of the vehicle 1 by a pair of slide rails such that the seat assembly 10 is slidable in the vehicle longitudinal direction (i.e., in the +vehicle X-direction as depicted).

The seat cushion frame 14 may include a base wall 16, pair of side walls 18, a front wall 20, and a rear wall 22. The pair of side walls 18 may extend in the vehicle longitudinal direction (i.e., in the +/−X-direction) when in the seated position, as shown in FIG. 1, and the front wall 20 and the rear wall 22 may extend in the vehicle lateral direction (i.e., in the +/−Z-direction). The pair of side walls 18, the front wall 20, and the rear wall 22 are formed to define a perimeter of the seat cushion frame 14. The seat cushion frame 14 may also include a notch 23, which provides access for seatbelt buckles or other seat accessories to the occupants supported by the seat cushion frame 14.

The seat cushion frame 14 is formed of a resin material. As a non-limiting example, the seat cushion frame 14 may be formed of at least one resin or a combination of resins such as nylon, polyester, polyurethane, vinyl, vinyl ester, and/or epoxy. In some embodiments, the seat cushion frame 14 may be formed of a fiber-reinforced resin material, for example, a glass-filled nylon resin material. In some embodiments, the base wall 16, the pair of side walls 18, the front wall 20, and the rear wall 22 of the seat cushion frame 14 are integrally formed as a one-piece monolithic structure. Specifically, the seat cushion frame 14 may be integrally molded from a fiber-reinforced resin material as a single one-piece monolithic structure.

Figure 2A:
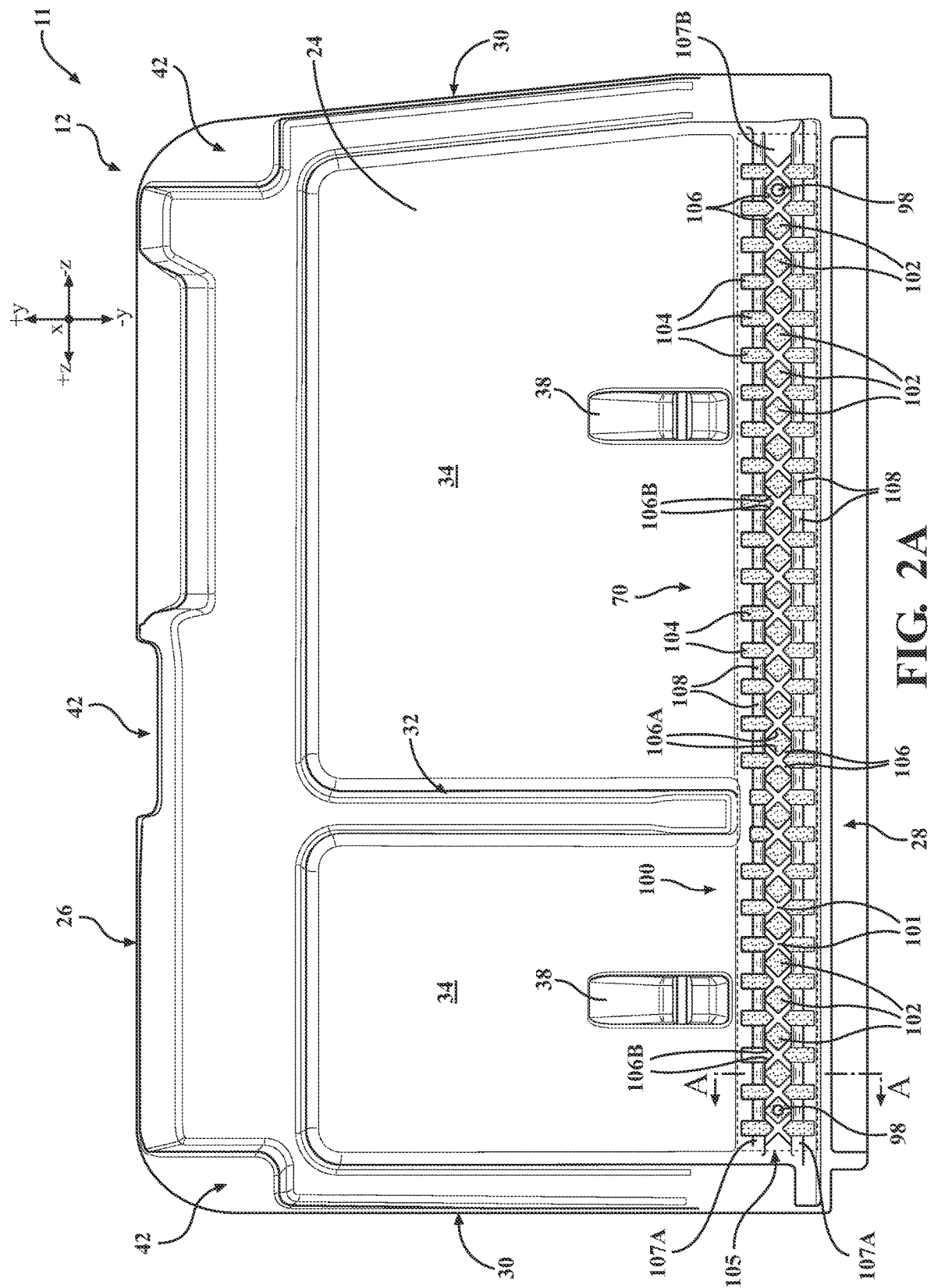
FIG. 2A schematically depicts a front view of a seat back frame of the seat assembly of FIG. 1 according to one or more embodiments shown and described herein.
Figure 2B:
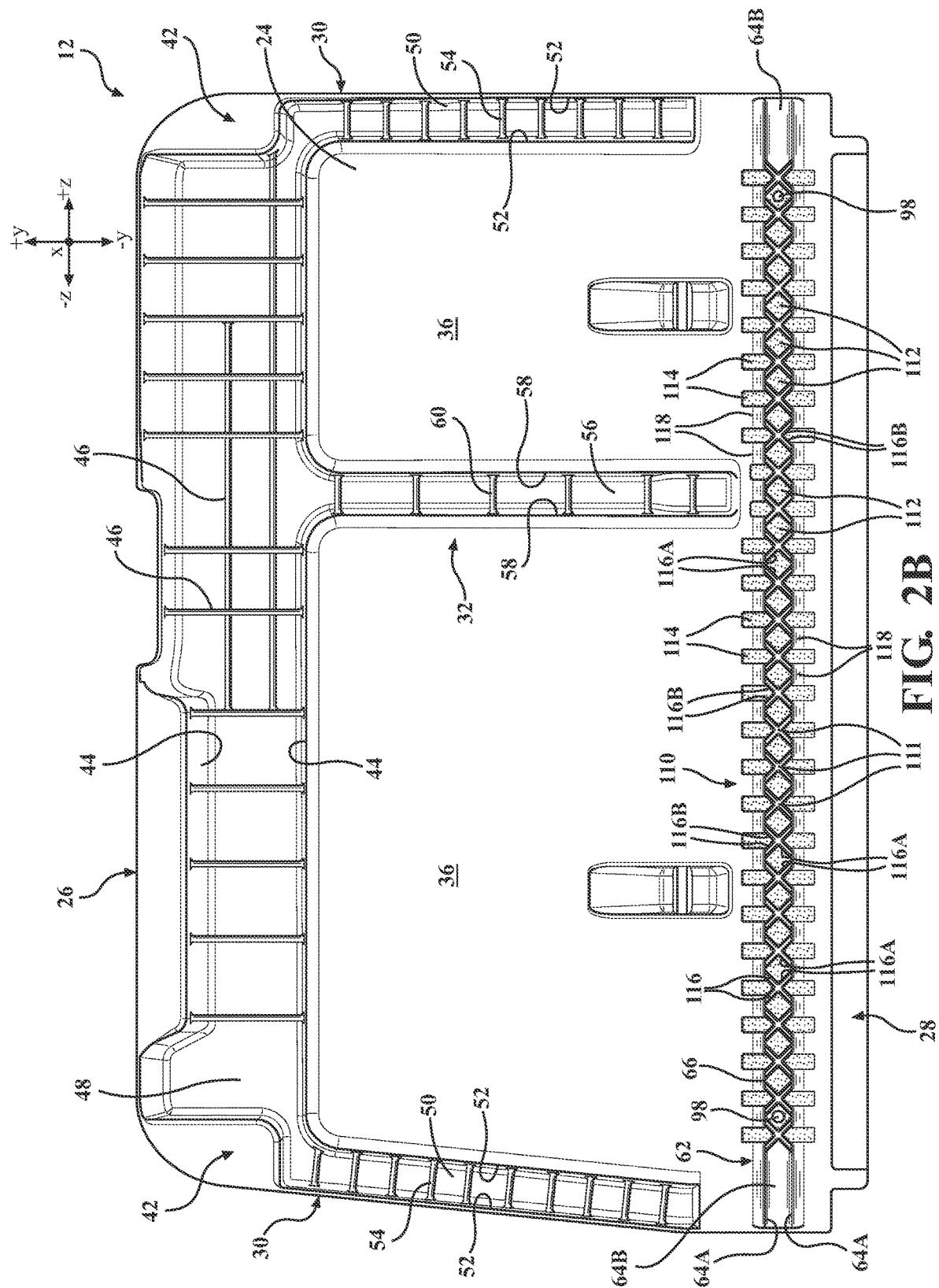
FIG. 2B schematically depicts a rear view of the seat back frame of the seat assembly of FIG. 1 according to one or more embodiments shown and described herein.

Referring to FIGS. 1 and 2A-2B, the seat back frame 12 includes base wall 24, an upper cross member 26, a lower cross member 28 spaced apart from the upper cross member 26, and a pair of side members 30. The upper cross member 26 and the lower cross member 28 may extend in the vehicle lateral direction (i.e., in the +/−Z-direction). The pair of side members 30 extend between ends of the upper cross member 26 and the lower cross member 28. The seat back frame 12 may include an intermediate cross member 32. The intermediate cross member 32 may extend from the upper cross member 26 towards the lower cross member 28 in the vehicle vertical direction (i.e., in the +/−Y-direction). The intermediate cross member 32 may provide for reinforcement of the seat back frame 12 in an area between where the occupants may be supported in situations in which the seat assembly 10 is a "60" seat. The base wall 24 of seat back frame 12 includes a front surface (hereinafter referred to as first surface) 34 and an opposite rear surface (hereinafter referred to as second surface) 36.

The seat back frame 12 includes a reinforcement portion 105 that includes a pair of side walls 107A and an intermediate wall 107B. The side walls 107A and the intermediate wall 107C form a portion of the first surface 34 that at least partially covers the pultrusion reinforcement 70.

The seat back frame 12 is formed of a resin material. As a non-limiting example, the seat back frame 12 may be formed of at least one resin or a combination of resins such as nylon, polyester, polyurethane, vinyl, vinylester, and/or epoxy. In some embodiments, the seat back frame 12 may be formed of a fiber-reinforced resin material, for example, a glass-filled nylon resin material. In some embodiments, the base wall 24, the upper cross member 26, the lower cross member 28, and the intermediate cross member 32 of the seat back frame 12 are integrally formed as a one-piece monolithic structure. Specifically, the seat back frame 12 may be integrally molded from a fiber-reinforced resin material as a single one-piece monolithic structure.

The seat back frame 12 may include latches 38 that are integrally formed within base wall 24. The latches 38 may be provided as anchors to secure child safety seats. In some embodiments, the seat back frame 12 may include notches 42, which provide access for seatbelt assemblies or other seat accessories to the occupants supported by the seat back frame 12.

Referring to FIG. 2B, the upper cross member 26 may be formed having a generally U-shape that defines a recess 48 on the second surface 36 of the seat back frame 12. The recess 48 may be defined by a pair of surfaces 44. A plurality of extension ribs 46 may extend within the recess 48 such as between the pair of surfaces 44. In some embodiments, the plurality of extension ribs 46 in a first direction and a second direction generally normal to the first direction such that plurality of extension ribs 46 couple to each other. The plurality of extension ribs 46 may be provided to reinforce the recess 48 of the upper cross member 26.

The pair of side members 30 may be formed having a generally U-shape that defines a recess 50 in the second surface 36 of the seat back frame 12. The recess 50 may be defined by a pair of surfaces 52. A plurality of extension ribs 54 may extend within the recess 50 between the pair of surfaces 52. The plurality of extension ribs 54 may be provided to reinforce the recess 50 of the pair of side members 30.

The intermediate cross member 32 may be formed having a generally U-shape that defines a recess 56 on the second surface 36 of the seat back frame 12. The recess 56 may be defined by a pair of surfaces 58. A plurality of extension ribs 60 may extend within the recess 56 between the pair of surfaces 58. The plurality of extension ribs 60 may be provided to reinforce the recess 56 of the intermediate cross member 32.

As will be described in greater detail below, a reinforcement recess 62 may be formed in the seat back frame 12 at a position in which the pultrusion reinforcement 70 is located. The reinforcement recess 62 may be defined by a pair of side walls 64A and an intermediate wall 64B that extends between the pair of side walls 64A. A plurality of reinforcement ribs 66 may extend within the reinforcement recess 62. The plurality of reinforcement ribs 66 may extend from the intermediate wall 64B and between the pair of side walls 64A.

Still referring to FIGS. 1 and 2A-2B, and 3A-3B, the seat back frame 12 includes the pultrusion reinforcement 70. In some embodiments, the pultrusion reinforcement 70 is an elongated reinforcement member that may extend within the seat back frame 12 in the vehicle lateral direction (i.e., in the +/−vehicle Z-direction). In the illustrated embodiments, the pultrusion reinforcement 70 is positioned between the lower cross member 28 and the upper cross member 26. It should be understood that in other embodiments, the pultrusion reinforcement 70 may be positioned at other locations of the seat back frame 12 and may extend in other vehicle directions (e.g., the pultrusion reinforcement 70 may be integrally provided within the upper cross member 26 and/or the lower cross member 28). The pultrusion reinforcement 70 is configured to further reinforce a rigidity of the seat back frame 12.

As will be described in greater detail below, the pultrusion reinforcement 70 is only partially overmolded into the seat back frame 12 during the molding process of the seat back frame 12. Specifically, the pultrusion reinforcement 70 is overmolded by the seat back frame 12 such that the pultrusion reinforcement 70 is positioned between the first surface 34 and the second surface 36 of the seat back frame 12. In some embodiments, the seat back frame 12 and the pultrusion reinforcement 70 are integrally molded as a one-piece monolithic structure.

Figure 3A:
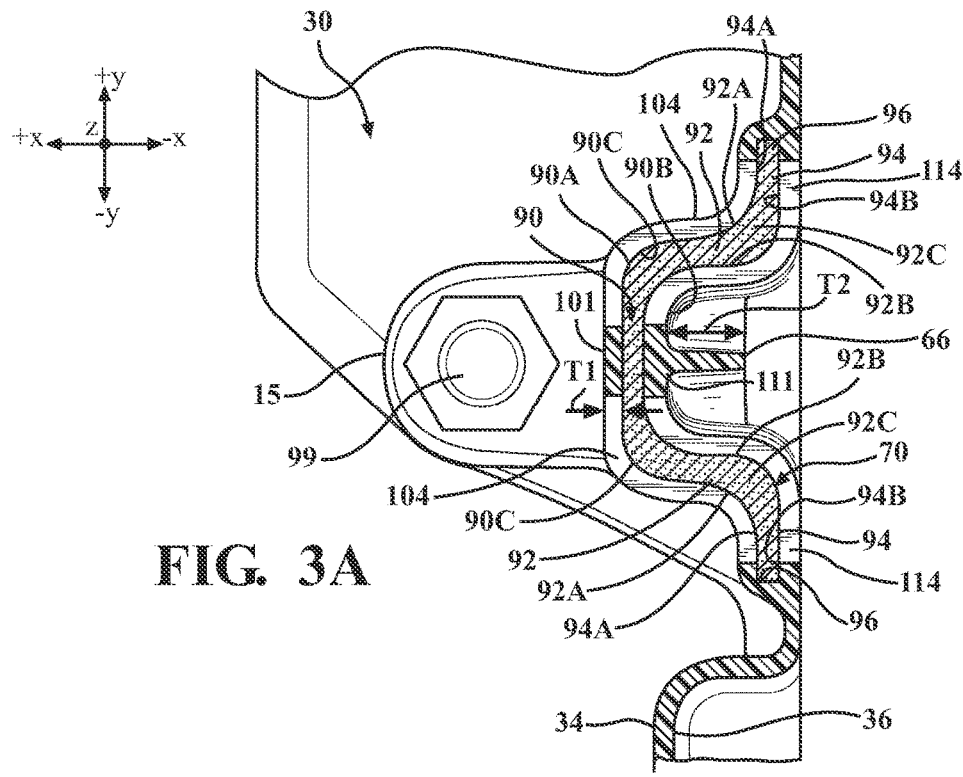
FIG. 3A schematically depicts a partial cross-sectional view of the seat back frame taken along the line A-A of FIG. 2A according to one or more embodiments shown and described herein.
Figure 3B:
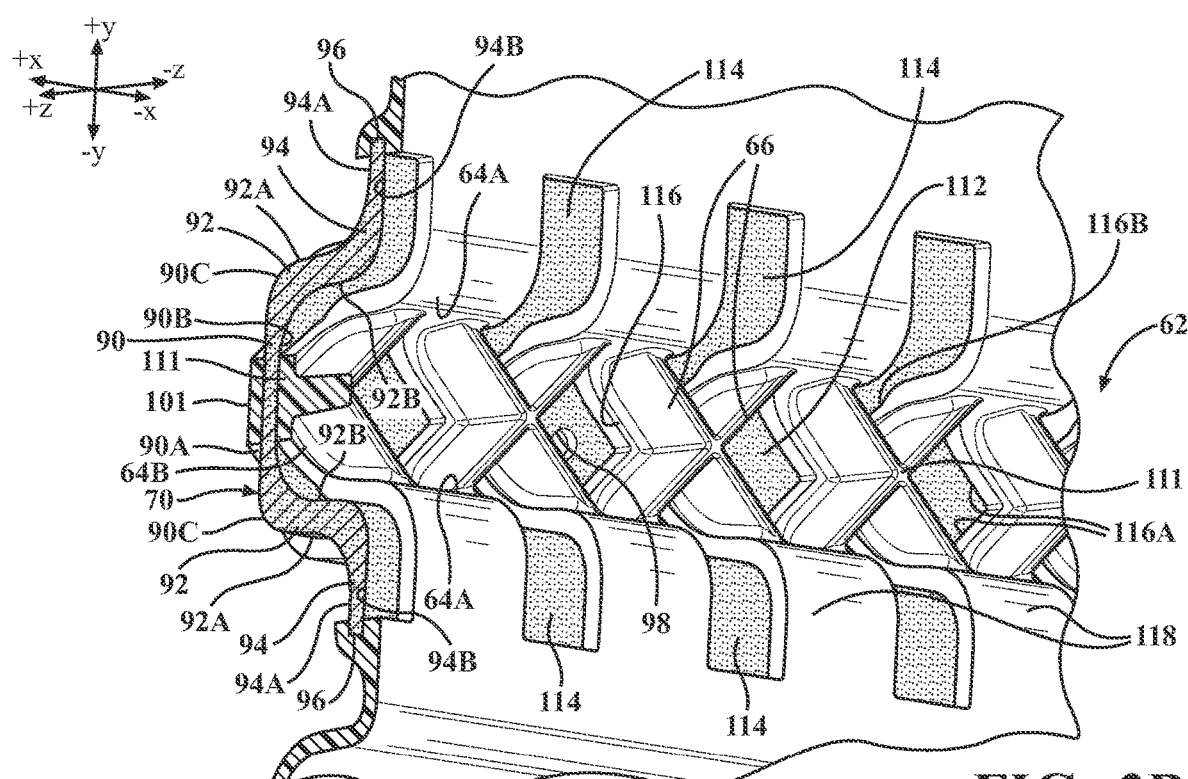
FIG. 3B schematically depicts a partial perspective view of the partial cross-sectional view of FIG. 3A according to one or more embodiments shown and described herein.

Referring to FIGS. 3A and 3B, the pultrusion reinforcement 70 is formed having a generally hat shape. The pultrusion reinforcement 70 includes a base wall 90, a pair of side walls 92, a pair of flanges 94, and a pair of distal edges 96. In some embodiments, the pultrusion reinforcement 70 may have other various geometric shapes, for example, a planar shape, regular shape, an irregular shape, or a complex shape.

The base wall 90 includes a first surface 90A, an opposite second surface 90B, and a pair of side edges 90C that extend between the first surface 90A and the second surface 90B. The first surface 90A of the base wall 90 is positioned so as to face an inner side of the first surface 34 of the seat back frame 12. The second surface 90B of the base wall 90 is positioned within the seat back frame 12 so as to face an inner side of the second surface 36 of the seat back frame 12.

The pair of side walls 92 include a first surface 92A, an opposite second surface 92B, and a pair of side edges 92C. Each of the pair of side walls 92 extend generally normal from the side edges 90C of the base wall 90. Each of the first surfaces 92A of the pair of side walls 92 is positioned within the seat back frame 12 so as to face an inner side of the first surface 34 of the seat back frame 12. Each of the second surfaces 92B of the pair of side walls 92 is positioned within the seat back frame 12 so as to face an inner side of the second surface 36 of the seat back frame 12.

The pair of flanges 94 include a first surface 94A and an opposite second surface 94B. Each of the pair of flanges 94 extend generally normal from side edges 92C of the pair of side walls 92. Each of the pair of flanges 94 extend between the side edges 92C of the pair of side walls 92 and the pair of distal edges 96. Each of the first surfaces 94A of the pair of flanges 94 is positioned within the seat back frame 12 so as to face an inner side of the first surface 34 of the seat back frame 12. Each of the second surfaces 92B of the pair of flanges 94 is positioned within the seat back frame 12 so as to face an inner side of the second surface 36 of the seat back frame 12.

Referring to FIGS. 1, 2A, and 2B, the pultrusion reinforcement 70 may also include a pair of bores 98. Each of the pair of bores 98 is positioned adjacent an end portion of the pultrusion reinforcement 70 in the longitudinal direction of the pultrusion reinforcement 70. The pair of bores 98 are formed in the base wall 90. Each of the pair of bores 98 extend between the first surface 90A and the opposite second surface 90B of the base wall 90. As will be described in greater detail below, the pair of bores 98 aid in the retention of the pultrusion reinforcement 70 in a predetermined position as the seat back frame 12 is overmolded onto the pultrusion reinforcement 70.

The pultrusion reinforcement 70 may be formed of a continuous fiber reinforced resin material. In some embodiments, the pultrusion reinforcement 70 may include a resin composite material and one or more fibers extending in one direction. As a non-limiting example, the one or more fibers may be glass fibers such as continuous glass fibers. As another non-limiting example, the one or more fibers may be glass fibers and nylon fibers (e.g., 95% of the one or more fibers are glass fibers, and 5% of the one or more fibers are nylon fibers). The one or more fibers may be configured to reinforce the resin composite material (e.g., resins such as epoxy, polyester, etc.) of the pultrusion reinforcement 70. As such, the glass fibers may increase a tensile strength, flex modulus, impact resistance, and dimensional stability of the pultrusion reinforcement 70. In some embodiments, the pultrusion reinforcement 70 is formed of a continuous glass fiber reinforced resin material.

In some embodiments, the pultrusion reinforcement 70 is formed using a continuous molding pultrusion process in which the reinforcing fibers, such as long strand glass-fibers, are saturated with a liquid resin material, such as a liquid polymer resin, then pulled through a heated forming die to create the generally hat shape of the pultrusion reinforcement 70. In some embodiments, pigments and catalysts that enhance the curing of pultrusion reinforcement 70 may be added while the one or more continuous glass fibers are saturated with the liquid resin material. It should be understood that the pultrusion reinforcement 70 may be formed using any suitable pultrusion process or other suitable manufacturing process in other embodiments.

Referring to FIGS. 1 and 2A, the first surface 34 of the seat back frame 12 is formed with a plurality of openings 100 positioned such that visual access to the pultrusion reinforcement 70 is permitted through the first surface 34 of the seat back frame 12. The plurality of openings 100 includes a plurality of shaped apertures 102 formed in the intermediate wall 107B and a plurality of slots 104 formed in the pair of side walls 107A and the intermediate wall 107B. The plurality of shaped apertures 102 and the plurality of slots 104 are separated by a plurality of link portions 106 and a plurality of parallel extension portions 108. The plurality of extension portions 108 extend from a top side and a bottom side of the plurality of link portions 106.

The plurality of link portions 106 have a generally X-shape when viewed from a front of the seat back frame 12. The plurality of link portions 106 includes interior sides 106A that define the plurality of shaped apertures 102 between with a generally regular shape. The plurality of link portions 106 includes exterior sides 106B that together with the plurality of extension portions 108 define the plurality of slots 104.

In some embodiments, the plurality of shaped apertures 102 are formed having a generally rhombus shape. It is appreciated that the shape of the plurality of shaped apertures 102 is not limited to generally rhombus shapes and may include other regular and non-regular geometric shapes, illustratively including triangles, circles, semicircles, and rectangles.

The plurality of shaped apertures 102 are formed in the first surface 34 of the seat back frame 12, by the interior sides 106A of the plurality of link portions 106, so as to be positioned over at least a portion of the base wall 90 of the pultrusion reinforcement 70. As such, at least a portion of the first surface 90A of the base wall 90 is configured to be visually inspected through the plurality of shaped apertures 102 formed in the seat back frame 12.

Referring to FIGS. 1, 2A, and 3A, the plurality of slots 104 are formed having a generally triangular shaped end defined by the exterior sides 106B of the plurality of link portions 106, and a remainder of the plurality of slots 104 are formed having a generally rectangular shape as each of the plurality of slots 104 are formed between adjacent extension portions 108. The plurality of slots 104 are formed in the first surface 34 of the seat back frame 12, by the exterior sides 106B of the plurality of link portions 106 and adjacent extension portions 108, so as to be positioned over at least a portion of the base wall 90, the pair of side walls 92, and the pair of flanges 94 of the pultrusion reinforcement 70. As such, at least a portion of the first surface 90A of the base wall 90, a portion of each of the first surfaces 92A of the pair of side walls 92, and a portion of each of the first surfaces 94A of the pair of flanges 94 are configured to be visually inspected through the plurality of slots 104. The plurality of link portions 106 of the seat back frame 12 include junctions 101. The junctions 101 are intersections of the plurality of link portions 106 of the first surface 34. The plurality of extension portions 108 are formed in the first surface 34 of the seat back frame 12 so as to extend upwardly and downwardly from the top and bottom, respectively, of the plurality of link portions 106. As such, the plurality of extension portions 108 are formed so as to extend over at least a portion of each of the first surface 90A of the base wall 90, a portion of each of the first surfaces 92A of the pair of side walls 92, and a portion of the first surfaces 94A of the pair of flanges 94.

Referring to FIGS. 2B, 3A, and 3B, the second surface 36 of the seat back frame 12 is formed with a plurality of openings 110 positioned such that visual access to the pultrusion reinforcement 70 is permitted through the second surface 36 of the seat back frame 12. The plurality of openings 110 formed in the second surface 36 of the seat back frame 12 includes a plurality of shaped apertures 112 formed in the intermediate wall 64B and a plurality of slots 114 formed in the side walls 64A and the intermediate wall 64B. The plurality of shaped apertures 112 and the plurality of slots 114 are separated by a plurality of link portions 116 and a plurality of extension portions 118. The plurality of extension portions 118 extend from a top side and a bottom side of the plurality of link portions 116.

The plurality of link portions 116 have a generally X-shape when viewed from a rear of the seat back frame 12. The plurality of link portions 116 have interior sides 116A that define the plurality of shaped apertures 112 between with a generally regular shape. The plurality of link portions 116 have exterior sides 116B that together with the plurality of extension portions 118 define the plurality of slots 114.

In some embodiments, the plurality of shaped apertures 112 are formed having a generally rhombus shape. It is appreciated that the shape of the plurality of shaped apertures 112 is not limited to generally rhombus shapes and may include other regular and non-regular geometric shapes, illustratively including triangles, circles, semicircles, and rectangles.

The plurality of shaped apertures 112 are formed in the second surface 36 of the seat back frame 12, by the interior sides 116A of the plurality of link portions 116, to as to be positioned over at least a portion of the base wall 90 of the pultrusion reinforcement 70. As such, at least a portion of the second surface 90B of the base wall 90 is configured to be visually inspected through the plurality of shaped apertures 112 formed in the seat back frame 12.

Still referring to FIGS. 2B and 3B, the plurality of slots 114 are formed having a generally triangular shaped end defined by the exterior sides 116B of the plurality of link portions 116 and a remainder of the plurality of slots 114 are formed having a generally rectangular shape as each of the plurality of slots 114 are formed between adjacent extension portions 118. The plurality of slots 114 are formed in the second surface 36 of the seat back frame 12, by the exterior sides 116B of the plurality of link portions 116 and adjacent extension portions 118, so as to be positioned over at least a portion of the base wall 90, the pair of side walls 92, and the pair of flanges 94 of the pultrusion reinforcement 70. As such, at least a portion of the second surface 90B of the base wall 90, a portion of each of the second surfaces 92B of the pair of side walls 92, and a portion of each of the second surfaces 94B of the pair of flanges 94 are configured to be visually inspected through the plurality of slots 114. The plurality of link portions 116 of the seat back frame 12 include junctions 111. The junctions 111 are intersections of the plurality of link portions 116 of the second surface 36. The plurality of extension portions 118 are formed in the second surface 36 of the seat back frame 12 so as to extend upwardly and downwardly from the top and bottom, respectively, of the plurality of link portions 116. As such, the plurality of extension portions 118 are formed so as to extend over at least a portion of the second surface 90B of the base wall 90, a portion of each of the second surfaces 92B of the pair of side walls 92, and a portion of each of the second surfaces 94B of the pair of flanges 94.

With reference to FIGS. 2B and 3B, the generally hat shape of the pultrusion reinforcement 70 defines the reinforcement recess 62. The plurality of reinforcement ribs 66 are positioned on and extend outwardly from the plurality of link portions 116. The plurality of reinforcement ribs 66 couple the plurality of link portions 116 to the side walls 64A of the reinforcement recess 62. In some embodiments, the plurality of reinforcement ribs 66 have a shape that corresponds to the shape of the plurality of link portions 116. In some embodiments, the plurality of reinforcement ribs 66 have a generally X-shape to accommodate the generally X-shape of the plurality of link portions 116, when viewed from a rear of the seat back frame 12. The plurality of reinforcement ribs 66 are configured to further reinforce a rigidity of the seat back frame 12.

In various embodiments, the plurality of link portions 106 may have a first thickness ($T_1$), and the plurality of ribs 66 may have a second thickness ($T_2$). In some embodiments, the second thickness ($T_2$) is greater than or equal to the first thickness ($T_1$). It should be understood that the second thickness ($T_2$) may be less than the first thickness ($T_1$) in other embodiments. As shown in FIG. 3A, the first thickness ($T_1$) is taken at the junction 101 and the second thickness ($T_2$) is taken at the junction 111 which extends through the reinforcement ribs 66. Specifically, the first thickness ($T_1$) is a thickness of the intermediate wall 107B and the second thickness ($T_2$) is a thickness of the intermediate wall 64B and the ribs 66.

While the embodiments illustrate the plurality of link portions 106, the plurality of link portions 116, and the plurality of ribs 66 having a generally X-shape, it should be understood that the plurality of link portions 106, the plurality of link portions 116, and the plurality of ribs 66 may have other geometrical configurations that enable the pultrusion reinforcement 70 to be visually inspected through the seat back frame 12 in other embodiments. As a non-limiting example, at least one of the plurality of link portions 106 and the plurality of link portions 116 having a generally circular or elliptical shape.

In various embodiments and as shown in FIG. 3A, the bracket 15 may be positioned adjacent (i.e., proximate or near) the pultrusion reinforcement 70 and may be configured to pivotally couple the side member 30 to the seat cushion frame 14 using a fastening member 99 (e.g., a rotatable fastening nut, a pivot bolt, a hinge, or other fastening element of the like).

With reference to FIGS. 1, 2A-2B, 3A-3B, and 4, an example process of forming the pultrusion reinforcement 70 and the seat back frame 12 having the pultrusion reinforcement 70 will now be described. As described above, the pultrusion reinforcement 70 may be formed during a pultrusion process. As a non-limiting example, the pultrusion process may include spooling one or more continuous glass fibers using a tension roller. The one or more continuous glass fibers may then be placed in a resin bath (e.g., a polyester, polyurethane, vinylester, epoxy, etc.), and the resin may permeate the one or more continuous glass fibers. In some embodiments, pigments and catalysts that enhance the curing of the pultrusion reinforcement 70 may be added while the one or more continuous glass fibers are within the resin bath. Subsequently, the mixture of the one or more continuous glass fibers and the resin may be provided to a heat source, such as a steel-forming die, in order to polymerize the resin. The polymerized resin and one or more continuous glass fibers are removed from the heat source as a solid fiberglass reinforced polymer. It should be understood that the pultrusion reinforcement 70 may be formed using any suitable pultrusion process or other suitable manufacturing process in other embodiments.

During the pultrusion process, various geometric characteristics of the pultrusion reinforcement 70 may be defined. As a non-limiting example and as shown in the illustrated embodiments of FIGS. 3A and 3B, the pultrusion reinforcement 70 may be formed in a generally hat shape and including include the base wall 90, the pair of side walls 92, the pair of flanges 94, and the pair of distal edges 96.

Figure 4:
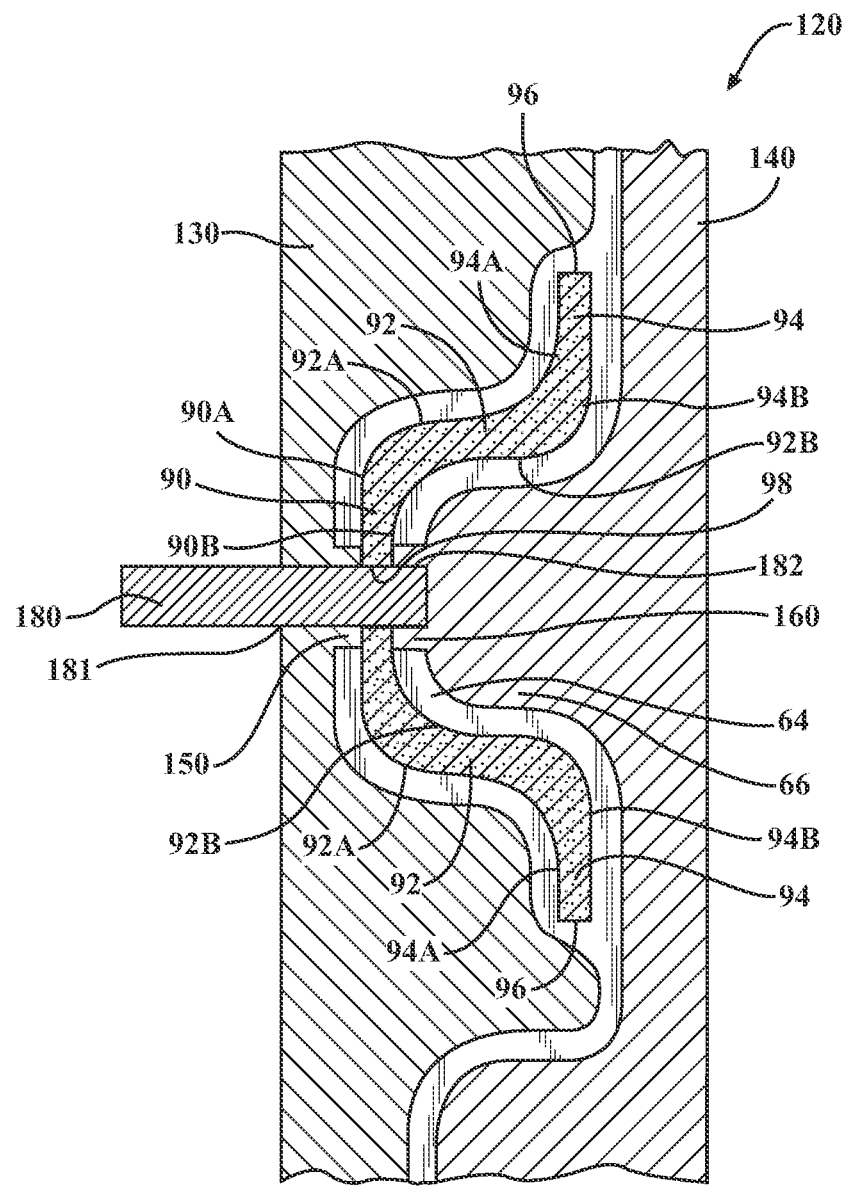
FIG. 4 schematically depicts a partial cross-sectional view of a molding apparatus for the seat back frame of FIG. 1 according to one or more embodiments shown and described herein.

Once the pultrusion reinforcement 70 is formed, the pultrusion reinforcement 70 is only partially overmolded within the seat back frame 12 such that the pultrusion reinforcement 70 is configured to be visually inspected through the seat back frame 12 through the plurality of openings 100 and plurality of openings 110. In some embodiments and with reference to FIG. 4, the pultrusion reinforcement 70 is placed into an overmold chamber 120. As a non-limiting example, the pultrusion reinforcement 70 may be positioned between a first molding substrate 130 and a second molding substrate 140 of the overmold chamber 120. In some embodiments, at least one of the first molding substrate 130 and the second molding substrate 140 may each include at least two pin bores 181 for receiving locating pins 180 (e.g., a two-way locating pin and a four-way locating pin), and the pair of bores 98 of the pultrusion reinforcement 70 may be aligned with the locating pins 180. As shown in FIG. 4, the locating pins 180 are aligned with and extend into the bores 98 of the pultrusion reinforcement 70 such that ends of the locating pins 180 contact a portion of the second molding substrate 140 upon closing of the overmold chamber 120. The second molding substrate 140 may include bores 182 that are configured to receive the locating pins 180. In some embodiments, the bores 182 are bottomed cavities and in some other embodiments, the bores 182 are throughbores that extend through the second molding substrate 140.

Accordingly, the engagement between the pair of bores 98 and the locating pins 180 retain the pultrusion reinforcement 70 in a predetermined position with respect to the overmold chamber 120 as the seat back frame 12 is overmolded onto the pultrusion reinforcement 70. Once the pultrusion reinforcement 70 is positioned between the first molding substrate 130 and the second molding substrate 140, the overmold chamber 120 is sealed and isolated from an environment external to the overmold chamber 120.

Subsequently, an injection molding material may be provided within the overmold chamber 120. As a non-limiting example, the injection molding material may be a nylon, polyester, polyurethane, vinyl, vinyl ester, and/or epoxy, or other any other suitable injection molding material. In some embodiments, an additive material (e.g., plasticizers, fibers, flame-retardants, colorants, etc.) may be heated and inserted into the overmold chamber 120 along with the injection molding material.

In some embodiments, the overmold chamber 120 defines a cavity between the first molding substrate 130 and the second molding substrate 140, in which the pultrusion reinforcement 70 is positioned during the overmold process. Each of the first molding substrate 130 and the second molding substrate 140 may have a geometry such that when the injection molding material in the overmold chamber 120 is cured, the pultrusion reinforcement 70 is positioned between the first surface 34 and the second surface 36 of the seat back frame 12.

In some embodiments, the first molding substrate 130 may have a geometry such that when the injection molding material in the overmold chamber 120 is cured, the plurality of link portions 106 and plurality of junctions 101 are formed in the first surface 34 of the seat back frame 12 to define the plurality of shaped apertures 102 and the plurality of slots 104. The sides of the plurality of projections 150 form the interior sides 106A and the exterior sides 106B of the plurality of link portions 106.

In some embodiments, the second molding substrate 140 may have a geometry such that when the injection molding material in the overmold chamber 120 is cured, the plurality of reinforcement ribs 66 is formed in the reinforcement recess 62 of the seat back frame 12. The second molding substrate 140 may have a geometry such that when injection molding material in the overmold chamber 120 is cured, the plurality of link portions 116 and plurality of junctions 111 are formed in the second surface 36 of the seat back frame 12 to define the plurality of shaped apertures 112, the plurality of slots 114, and the plurality of ribs 66. The sides of the plurality of projections 160 form the interior sides 116A and the exterior sides 116B of the plurality of link portions 116.

Still referring to FIG. 4, the first molding substrate 130 may include a plurality of projections 150 (e.g., a plurality of aperture projections and a plurality of slot projections) extending from a mold surface of the first molding substrate 130. The plurality of aperture projections 150 may directly contact the first surface 90A of the base wall 90 of the pultrusion reinforcement 70 during the overmold process and may have a shape that corresponds to the shape of the plurality of shaped apertures 102. The plurality of slot projections 150 may directly contact the first surface 90A of the base wall 90, the first surface 92A of the pair of side walls 92, and the first surface 94A of the pair of flanges 94 during the overmold process and may have a shape that corresponds to the shape of the plurality of slots 104.

Accordingly, when the injection molding material is added into the overmold chamber 120, the injection molding material is not positioned between the first surface 90A of the base wall 90 and the aperture projections 150 so as to form the plurality of shaped apertures 102. Similarly, when the injection molding material is added into the overmold chamber 120, the injection molding material is not positioned between the first surface 90A of the base wall 90, the first surface 92A of the pair of side walls 92, the first surface 94A of the pair of flanges 94, and the slot projections 150 so as to form the plurality of slots 104.

Therefore, when the injection molding material in the overmold chamber 120 is cured, the plurality of shaped apertures 102 of the plurality of openings 100 and the plurality of slots 104 of the plurality of openings 100 are formed in the first surface 34 of the seat back frame 12 such that the pultrusion reinforcement 70 is configured to be visually inspected through the seat back frame 12.

Still referring to FIG. 4, the second molding substrate 140 may include a plurality of projections 160 (e.g., a plurality of aperture projections and a plurality of slot projections) extending from a molding surface of the second molding substrate 140. The plurality of aperture projections 160 may directly contact the second surface 90B of the base wall 90 of the pultrusion reinforcement 70 during the overmold process and may have a shape that corresponds to the shape of the plurality of shaped apertures 112. The plurality of slot projections 160 may directly contact the second surface 90B of the base wall 90, the second surface 92B of the pair of side walls 92, and the second surface 94B of the pair of flanges 94 during the overmold process and may have a shape that corresponds to the shape of the plurality of slots 114 and the plurality of ribs 66.

Accordingly, when the injection molding material is added into the overmold chamber 120, the injection molding material is not positioned between the second surface 90B of the base wall 90 and the aperture projections 160 so as to form the plurality of shaped apertures 112. Similarly, when the injection molding material is added into the overmold chamber 120, the injection molding material is not positioned between the second surface 90B of the base wall 90, the second surface 92B of the pair of side walls 92, the second surface 94B of the pair of flanges 94, and the slot projections so as to form the plurality of slots 114 and the plurality of ribs 66.

Therefore, when the injection molding material in the overmold chamber 120 is cured, the plurality of shaped apertures 112 of the plurality of openings 100, the plurality of slots 114 of the plurality of openings 100, and the plurality of ribs 66 are formed in the second surface 36 of the seat back frame 12 such that the pultrusion reinforcement 70 is configured to be visually inspected through the seat back frame 12.

It is appreciated that the first molding substrate 130 and the second molding substrate 140 may each have a shape that corresponds to the shape of the plurality of link portions 106 and the plurality of link portions 116. Accordingly, when the injection molding material in the overmold chamber 120 is cured, the plurality of link portions 106 and the plurality of link portions 116 of the plurality of openings 100 are formed in first surface 34 and the second surface 36, respectively, of the seat back frame 12.

It should now be understood that vehicles according to the present disclosure include seat assemblies 10 including a seat back frame 12 and a seat cushion frame 14. In embodiments, the seat back frame 12 includes the plurality of openings 100 on the first surface 34 and the second surface 36 of the pultrusion reinforcement 70 that are formed during the overmold process. Accordingly, seat back frame 12 is configured to enable visual inspection of the pultrusion reinforcement 70 after the overmold process is completed, thereby enabling an operator to verify that the pultrusion reinforcement 70 is properly positioned and undamaged upon completion of the overmold process, thereby enabling visual inspection of the pultrusion reinforcement 70 after the overmold process is completed. Moreover, pultrusion reinforcement 70 includes the plurality of reinforcement ribs 66 formed in the reinforcement recess 62 of the seat back frame 12 during the overmold process. Accordingly, the plurality of reinforcement ribs 66 may provide rigidity against a torsion force applied to the seat back frame 12.

Accordingly, a method of forming the seat back assembly 10 includes providing the pultrusion reinforcement 70, overmolding the seat back frame 12 onto the pultrusion reinforcement 70, and forming the plurality of openings 100 and the plurality of openings 110 in the seat back frame 12 when overmolding the seat back frame 12 onto the pultrusion reinforcement 70 such that the pultrusion reinforcement 70 is configured to be visually inspected through the plurality of openings 100 and the plurality of openings 110.

The method also includes the step of forming the plurality of openings 100 on a first surface 34 of the seat back frame 12. The plurality of openings 100 includes the plurality of shaped apertures 102 and plurality of slots 104. The method also includes the step of forming the plurality of openings 110 on the second surface 36 of the seat back frame. The plurality of openings 110 includes the plurality of shaped apertures 112 and plurality of slots 114. The method also includes the step of forming the plurality of reinforcement ribs 66 in the second surface 36 of the seat back frame 12.

Referring to FIGS. 5-8, a seat assembly according to another embodiment is generally illustrated at 1010. The seat assembly 1010 is similar to the seat assembly 10 except that the seat assembly 1010 includes a seat back assembly 1011 having a seat back frame 1012 and a pultrusion reinforcement 1070. As will be described in in greater detail below, the pultrusion reinforcement 1070 is only partially overmolded within the seat back frame 1012 such that the pultrusion reinforcement 1070 is configured to be visually inspected through the seat back frame 1012. The seat assembly 1010 includes the seat cushion frame 14 of the seat assembly 10 which may be coupled to the seat back frame 1012 via the pair of brackets 15 that area coupled the seat back frame 1012 a fastener.

Figure 5:
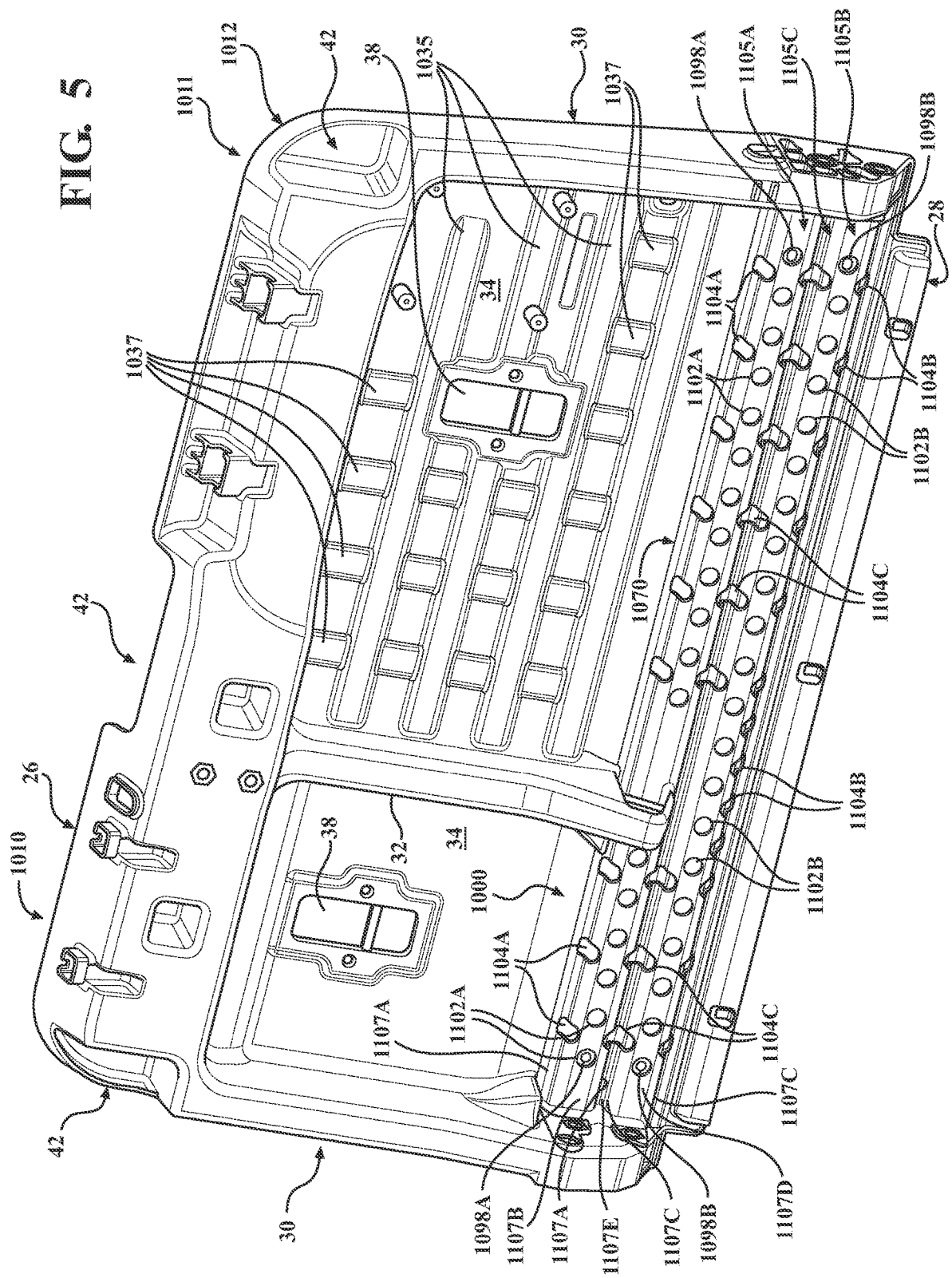
FIG. 5 schematically depicts a perspective view of a seat back assembly according to one or more embodiments shown and described herein.
Figure 6B:
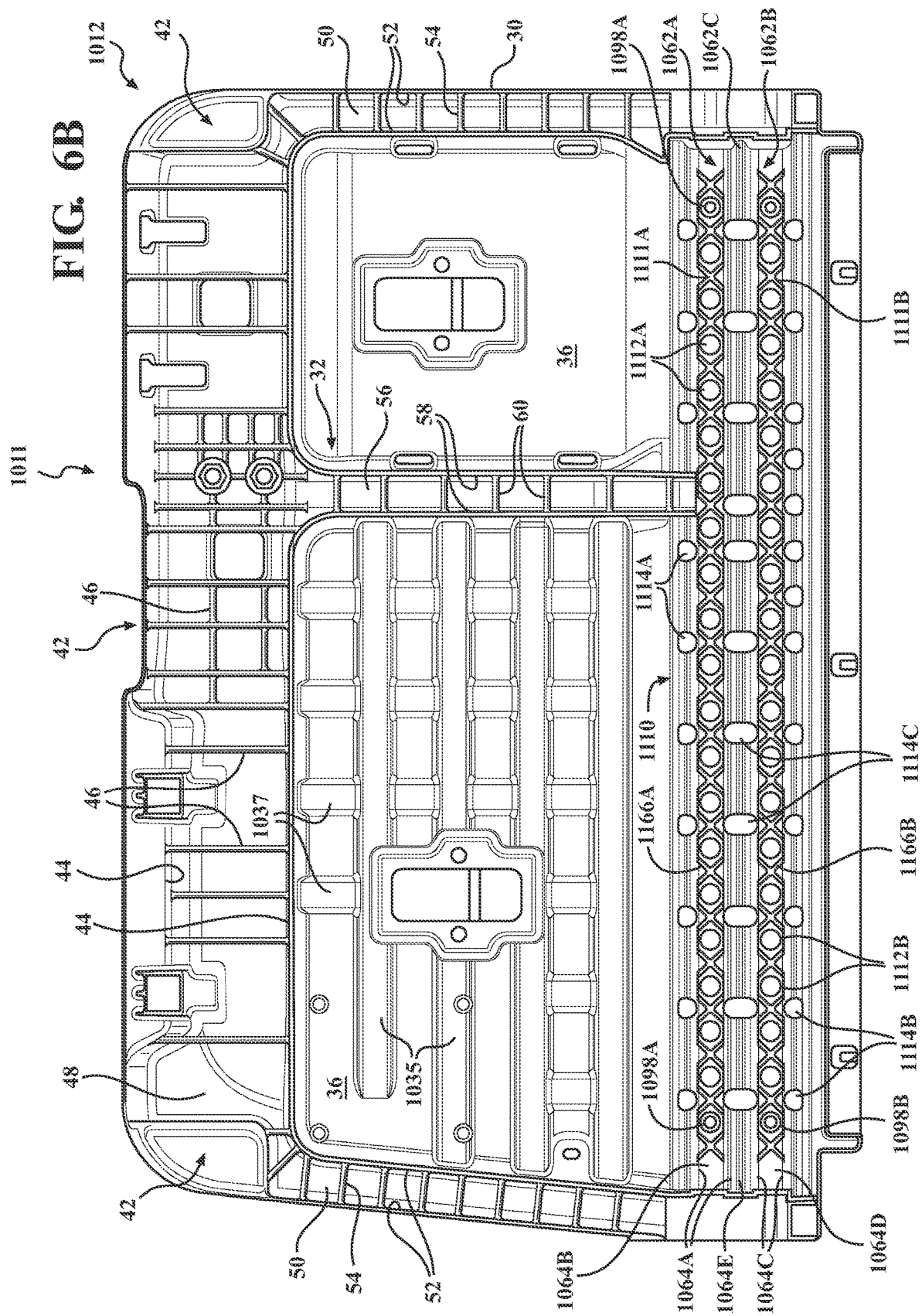
FIG. 6B schematically depicts a rear view of the seat back frame of the seat back assembly of FIG. 5 according to one or more embodiments shown and described herein.

Referring to FIGS. 5 and 6A-6B, the seat back frame 1012 is similar to the seat back frame 12 except the seat back frame 1012 includes an upper reinforcement portion 1105A, a lower reinforcement portion 1105B, and an intermediate reinforcement recess 1105C positioned between the upper reinforcement portion 1105A and the lower reinforcement portion 1105B. The upper reinforcement portion 1105A includes a pair of upper side walls 1107A and an upper intermediate wall 1107B that extends between the pair of upper side walls 1107A. The lower reinforcement portion 1105B includes a pair of lower side walls 1107C and a lower intermediate wall 1107D that extends between the pair of lower side walls 1170C. The intermediate reinforcement recess 1105C includes an inner wall 1107E that extends between an inner one of the pair of upper side walls 1107A and an inner one of the pair of lower side walls 1107C. The pair of upper side walls 1107A, the upper intermediate wall 1107B, the inner wall 1107E, the pair of lower side walls 1107C, and the lower intermediate wall 1107D are formed as part of the second surface 36 which at least partially covers the pultrusion reinforcement 1070.

The seat back frame 1012 includes base wall 24, an upper cross member 26, a lower cross member 28 spaced apart from the upper cross member 26, and a pair of side members 30. The upper cross member 26 and the lower cross member 28 may extend in the vehicle lateral direction (i.e., in the +/−Z-direction). The pair of side members 30 extend between ends of the upper cross member 26 and the lower cross member 28. The seat back frame 1012 may include an intermediate cross member 32. The intermediate cross member 32 may extend from the upper cross member 26 towards the lower cross member 28 in the vehicle vertical direction (i.e., in the +/−Y-direction). The intermediate cross member 32 may provide for reinforcement of the seat back frame 1012 in an area between where the occupants may be supported in situations in which the seat assembly 10 is a "60" seat. The base wall 24 of seat back frame 1012 includes a front surface (hereinafter referred to as first surface) 34 and an opposite rear surface (hereinafter referred to as second surface) 36.

The seat back frame 1012 is formed of a resin material. As a non-limiting example, the seat back frame 1012 may be formed of at least one resin or a combination of resins such as nylon, polyester, polyurethane, vinyl, vinylester, and/or epoxy. In some embodiments, the seat back frame 1012 may be formed of a fiber-reinforced resin material, for example, a glass-filled nylon resin material. In some embodiments, the base wall 24, the upper cross member 26, the lower cross member 28, and the intermediate cross member 32 of the seat back frame 1012 are integrally formed as a one-piece monolithic structure. Specifically, the seat back frame 1012 may be integrally molded from a fiber-reinforced resin material as a single one-piece monolithic structure.

The seat back frame 1012 may include latches 38 that are integrally formed within base wall 24. The latches 38 may be provided as anchors to secure child safety seats. In some embodiments, the seat back frame 1012 may include notches 42, which provide access for seatbelt assemblies or other seat accessories to the occupants supported by the seat back frame 12.

Referring to FIGS. 5 and 6A, the first surface 34 may be formed with a plurality of first reinforcements 1035 and a plurality of second reinforcements 1037. The first reinforcements 1035 extend in a first direction and the second reinforcements 1037 extend in a second direction generally normal to the first direction. The first reinforcements 1035 extend continuously between one of the pair of side members 30 and the intermediate cross member 32. The second reinforcements 1037 extend discontinuously between the upper cross member 26 and the lower cross member 28. The second reinforcements 1037 extend between each of the plurality of first reinforcements 1035 so as to be discontinuous at the intersection of the plurality of first reinforcements 1035 and the plurality of second reinforcements 1037. The plurality of first reinforcements 1035 and the plurality of second reinforcements 1037 are formed with a generally U-shaped cross section and are raised with respect to the first surface 34.

Referring to FIG. 6B, the upper cross member 26 may be formed having a generally U-shape that defines a recess 48 on the second surface 36 of the seat back frame 1012. The recess 48 may be defined by a pair of surfaces 44. A plurality of extension ribs 46 may extend within the recess 48 such as between the pair of surfaces 44. In some embodiments, the plurality of extension ribs 46 in a first direction and a second direction generally normal to the first direction such that plurality of extension ribs 46 couple to each other. The plurality of extension ribs 46 may be provided to reinforce the recess 48 of the upper cross member 26.

The pair of side members 30 may be formed having a generally U-shape that defines a recess 50 in the second surface 36 of the seat back frame 12. The recess 50 may be defined by a pair of surfaces 52. A plurality of extension ribs 54 may extend within the recess 50 between the pair of surfaces 52. The plurality of extension ribs 54 may be provided to reinforce the recess 50 of the pair of side members 30.

The intermediate cross member 32 may be formed having a generally U-shape that defines a recess 56 on the second surface 36 of the seat back frame 1012. The recess 56 may be defined by a pair of surfaces 58. A plurality of extension ribs 60 may extend within the recess 56 between the pair of surfaces 58. The plurality of extension ribs 60 may be provided to reinforce the recess 56 of the intermediate cross member 32.

As will be described in greater detail below, the second surface 36 of the seat back frame 1012 may be formed with an upper reinforcement recess 1062A, a lower reinforcement recess 1062B, and an intermediate reinforcement portion 1062C at a position in which the pultrusion reinforcement 1070 is located. The intermediate reinforcement portion 1062C is positioned between the upper reinforcement recess 1062A and the lower reinforcement recess 1062B. The upper reinforcement recess 1062A may be defined by a pair of upper side walls 1064A and an upper intermediate wall 1064B that extends between the pair of upper side walls 1064A. The lower reinforcement recess 1062B may be defined by a pair of lower side walls 1064C and a lower intermediate wall 1064D that extends between the pair of lower side walls 1064C. The intermediate reinforcement portion 1062C includes an inner wall 1064E that extends between a lower one of the pair of upper side walls 1064A and an upper one of the pair of lower side walls 1064C.

A plurality of upper reinforcement ribs 1066A may extend within the upper reinforcement recess 1062A. The plurality of upper reinforcement ribs 1066A may extend from the upper intermediate wall 1064B and extend between the pair of upper side walls 1064A. A plurality of lower reinforcement ribs 1066B may extend within the lower reinforcement recess 1062B. The plurality of lower reinforcement ribs 1066B may extend from the lower intermediate wall 1064D and extend between the pair of lower side walls 1064C.

In some embodiments, the plurality of upper reinforcement ribs 1066A and the plurality of lower reinforcement ribs 1066B have a generally X-shape when viewed from a rear of the seat back frame 1012. The plurality of upper reinforcement ribs 1066A and the plurality of lower reinforcement ribs 1066B are configured to further reinforce a rigidity of the seat back frame 1012. The plurality of upper reinforcement ribs 1066A include junctions 1111A at a position where the plurality of upper reinforcement ribs 1066A intersect due to the generally X-shape. The plurality of lower reinforcement ribs 1066B include junctions 1111B at a position where the plurality of lower reinforcement ribs 1066B intersect due to the generally X-shape.

Still referring to FIGS. 5 and 6A-6B, the seat back frame 1012 includes the pultrusion reinforcement 1070. In some embodiments, the pultrusion reinforcement 70 is an elongated reinforcement member that may extend within the seat back frame 1012 in the vehicle lateral direction (i.e., in the +/−vehicle Z-direction). In the illustrated embodiments, the pultrusion reinforcement 1070 is positioned between the lower cross member 1028 and the upper cross member 1026. It should be understood that in other embodiments, the pultrusion reinforcement 1070 may be positioned at other locations of the seat back frame 1012 and may extend in other vehicle directions (e.g., the pultrusion reinforcement 1070 may be integrally provided within the upper cross member 26 and/or the lower cross member 1028). The pultrusion reinforcement 1070 is configured to further reinforce a rigidity of the seat back frame 1012.

As will be described in greater detail below, the pultrusion reinforcement 1070 is only partially overmolded into the seat back frame 1012 during the molding process of the seat back frame 1012. Specifically, the pultrusion reinforcement 1070 is overmolded by the seat back frame 1012 such that the pultrusion reinforcement 1070 is positioned between the first surface 34 and the second surface 36 of the seat back frame 1012. In some embodiments, the seat back frame 1012 and the pultrusion reinforcement 1070 are integrally molded as a one-piece monolithic structure.

Figure 7:
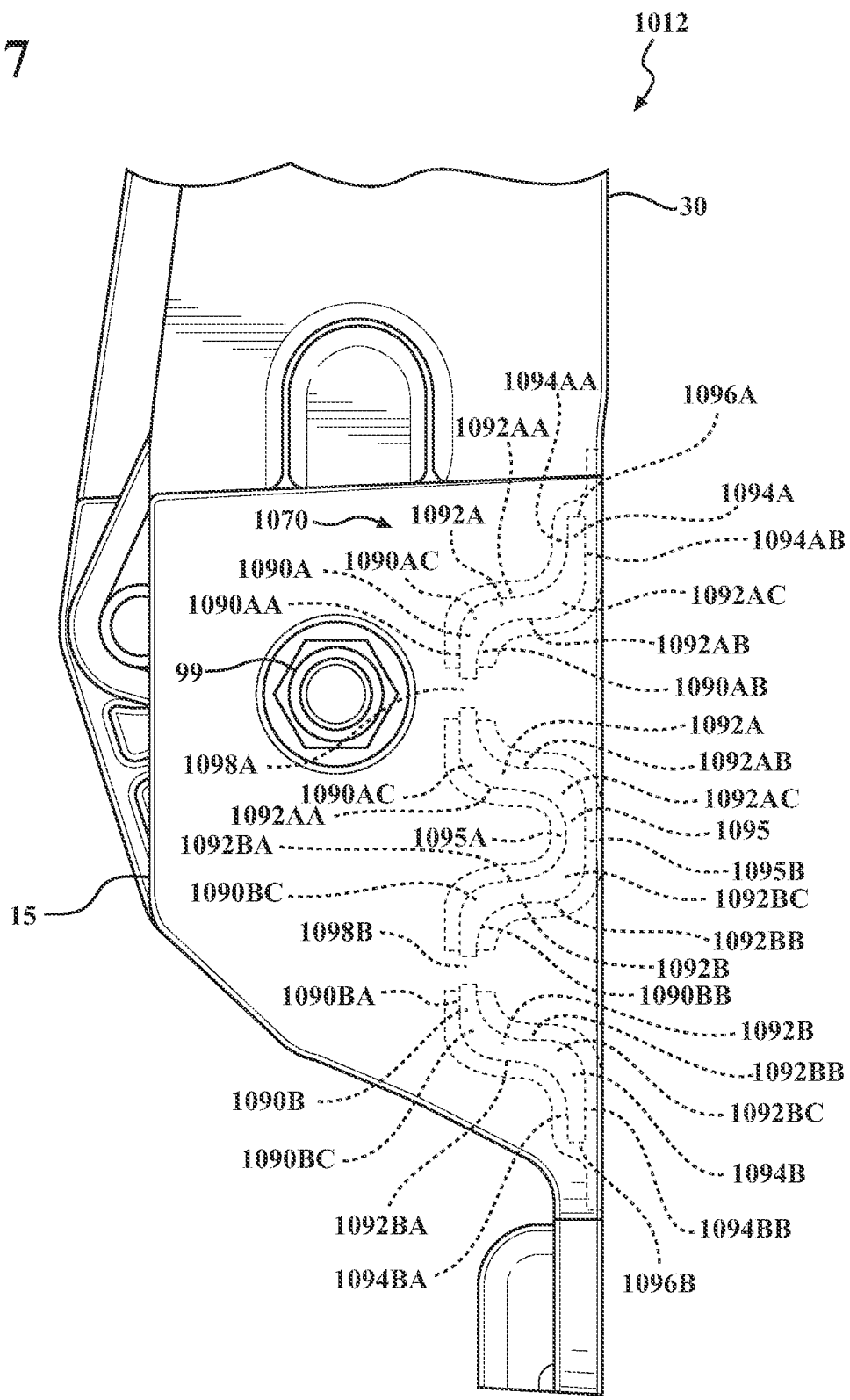
FIG. 7 schematically depicts a partial side view of the seat back frame of the seat back assembly of FIG. 5 according to one or more embodiments shown and described herein.

Referring to FIGS. 7 and 8, the pultrusion reinforcement 1070 is formed having a generally double hat shape. The pultrusion reinforcement 1070 includes an upper base wall 1090A, a pair of upper side walls 1092A, an upper flange 1094A, a lower base wall 1090B, a pair of lower side walls 1092B, a lower flange 1094B, a center wall 1095, and an upper distal edge 1096A and a lower distal edge 1096B. In some embodiments, the pultrusion reinforcement 1070 may have other various geometric shapes, for example, a planar shape, regular shape, an irregular shape, or a complex shape. The pair of upper side walls 1092A includes a first upper side wall that extends between the upper flange 1094A and the upper base wall 1090A and a second upper side wall that extends between the upper base wall 1090A and the center wall 1095. The pair of lower side walls 1092B includes a first lower side wall that extends between the center wall 1095 and the lower base wall 1090B and a second lower side wall that extends between the lower base wall 1090B and the lower flange 1094B.

The upper base wall 1090A includes a first upper surface 1090AA, an opposite second upper surface 1090AB, and a pair of upper side edges 1090AC that extend between the first upper surface 1090AA and the second upper surface 1090AB. The first upper surface 1090AA of the upper base wall 1090A is positioned so as to face an inner side of the first surface 34 of the seat back frame 1012, specifically, the inner side of the upper intermediate wall 1107B of the first surface 34 of the seat back frame 1012. The second upper surface 1090AB of the upper base wall 1090A is positioned within the seat back frame 1012 so as to face an inner side of the second surface 36 of the seat back frame 1012, specifically, the inner side of the upper intermediate wall 1064B of the second surface 36 of the seat back frame 1012.

The pair of upper side walls 1092A include a first upper surface 1092AA, an opposite second upper surface 1092AB, and a pair of upper side edges 1092AC. Each of the pair of upper side walls 1092A extend generally normal from the upper side edges 1090AC of the upper base wall 1090A. Each of the first upper surfaces 1092AA of the pair of upper side walls 1092A is positioned within the seat back frame 1012 so as to face an inner side of the first surface 34 of the seat back frame 1012, specifically, the inner side of the upper side walls 1107A of the first surface 34 of the seat back frame 1012. Each of the second upper surfaces 1092AB of the pair of upper side walls 1092A is positioned within the seat back frame 1012 so as to face an inner side of the second surface 36 of the seat back frame 1012, specifically, the inner side of the upper side walls 1064A of the second surface 36 of the seat back frame 1012.

The upper flange 1094A includes a first upper surface 1094AA and an opposite second upper surface 1094AB. The upper flange 1094A extends generally normal from one of the upper side edge 1092AC of the upper side wall 1092A to the upper distal edge 1096A. The first upper surface 1094AA of the upper flange 1094A is positioned within the seat back frame 1012 so as to face an inner side of the first surface 34 of the seat back frame 1012. The second upper surface 1092AB of the upper flange 1094A is positioned within the seat back frame 1012 so as to face an inner side of the second surface 36 of the seat back frame 1012.

The lower base wall 1090B includes a first lower surface 1090BA, an opposite second lower surface 1090BB, and a pair of lower side edges 1090BC that extend between the first lower surface 1090BA and the second lower surface 1090BB. The first lower surface 1090BA of the lower base wall 1090B is positioned so as to face an inner side of the first surface 34 of the seat back frame 1012, specifically, the inner side of the lower intermediate wall 1107D of the first surface 34 of the seat back frame 1012. The second lower surface 1090BB of the lower base wall 1090B is positioned within the seat back frame 1012 so as to face an inner side of the second surface 36 of the seat back frame 1012, specifically, the inner side of the lower intermediate wall 1064D of the second surface 36 of the seat back frame 1012.

The pair of lower side walls 1092B include a first lower surface 1092BA, an opposite second lower surface 1092BB, and a pair of lower side edges 1092BC. Each of the pair of lower side walls 1092B extend generally normal from the lower side edges 1090BC of the lower base wall 1090B. Each of the first lower surfaces 1092BA of the pair of lower side walls 1092B is positioned within the seat back frame 1012 so as to face an inner side of the first surface 34 of the seat back frame 1012, specifically, the inner side of the lower side walls 1107C of the first surface 34 of the seat back frame 1012. Each of the second lower surfaces 1092BB of the pair of lower side walls 1092B is positioned within the seat back frame 1012 so as to face an inner side of the second surface 36 of the seat back frame 1012, specifically, the inner side of the lower side walls 1064C of the second surface 36 of the seat back frame 1012.

The lower flange 1094B includes a first lower surface 1094BA and an opposite second lower surface 1094BB. The lower flange 1094B extends generally normal from one of the lower side edges 1092BC of the pair of lower side walls 1092B to the lower distal edge 1096B. The first lower surface 1094BA of the lower flange 1094B is positioned within the seat back frame 1012 so as to face an inner side of the first surface 34 of the seat back frame 1012. The second lower surface 1092BB of the lower flange 1094B is positioned within the seat back frame 1012 so as to face an inner side of the second surface 36 of the seat back frame 1012.

The center wall 1095 includes a first surface 1095A and an opposite second surface 1095B. The center wall 1095 extends between the upper side edge 1092AC of the lower one of the pair of upper side walls 1092A and the lower side edge 1092BC of the upper one of the pair of lower side walls 1092B. The first surface 1095A of the center wall 1095 is positioned within the seat back frame 1012 so as to face an inner side of the first surface 34 of the seat back frame 1012, specifically, the inner side of the inner wall 1107E of the first surface 34 of the seat back frame 1012. The second surface 1095B of the center wall 1095 is positioned within the seat back frame 1012 so as to face an inner side of the second surface 36 of the seat back frame 1012, specifically, the inner side of the inner wall 1064E of the first surface 34 of the seat back frame 1012.

Referring to FIGS. 5, 6A-6B, and 7, the pultrusion reinforcement 1070 may also include a pair of upper bores 1098A and a pair of lower bores 1098B. Each of the pair of upper bores 1098A is positioned in the upper base wall 1090A adjacent an end portion of the pultrusion reinforcement 1070 in the longitudinal direction of the pultrusion reinforcement 1070. Each of the pair of upper bores 1098A extend between the first upper surface 1090AA and the opposite second upper surface 1090AB of the upper base wall 1090A. Each of the pair of lower bores 1098B is positioned in the lower base wall 1090B adjacent an end portion of the pultrusion reinforcement 1070 in the longitudinal direction of the pultrusion reinforcement 1070. Each of the pair of lower bores 1098B extend between the first lower surface 1090BA and the opposite second lower surface 1090BB of the lower base wall 1090B. As will be described in greater detail below, the pair of upper bores 1098A and the pair of lower bores 1098B aid in the retention of the pultrusion reinforcement 1070 in a predetermined position as the seat back frame 1012 is overmolded onto the pultrusion reinforcement 1070.

The pultrusion reinforcement 1070 may be formed of a continuous fiber reinforced resin material. In some embodiments, the pultrusion reinforcement 1070 may include a resin composite material and one or more fibers extending in one direction. As a non-limiting example, the one or more fibers may be glass fibers such as continuous glass fibers. As another non-limiting example, the one or more fibers may be glass fibers and nylon fibers (e.g., 95% of the one or more fibers are glass fibers, and 5% of the one or more fibers are nylon fibers). The one or more fibers may be configured to reinforce the resin composite material (e.g., resins such as epoxy, polyester, etc.) of the pultrusion reinforcement 1070. As such, the glass fibers may increase a tensile strength, flex modulus, impact resistance, and dimensional stability of the pultrusion reinforcement 1070. In some embodiments, the pultrusion reinforcement 1070 is formed of a continuous glass fiber reinforced resin material.

In some embodiments, the pultrusion reinforcement 1070 is formed using a continuous molding pultrusion process in which the reinforcing fibers, such as long strand glass-fibers, are saturated with a liquid resin material, such as a liquid polymer resin, then pulled through a heated forming die to create the generally hat shape of the pultrusion reinforcement 1070. In some embodiments, pigments and catalysts that enhance the curing of pultrusion reinforcement 1070 may be added while the one or more continuous glass fibers are saturated with the liquid resin material. It should be understood that the pultrusion reinforcement 1070 may be formed using any suitable pultrusion process or other suitable manufacturing process in other embodiments.

Referring to FIGS. 5 and 6A, the first surface 34 of the seat back frame 1012 is formed with a plurality of openings 1100 positioned such that visual access to the pultrusion reinforcement 1070 is permitted through the first surface 34 of the seat back frame 1012. The plurality of openings 1100 includes a plurality of upper shaped apertures 1102A, a plurality of lower shaped apertures 1102B, a plurality of upper slots 1104A, a plurality of lower slots 1104B, and a plurality of intermediate slots 1104C. The plurality of upper shaped apertures 1102A are provided on the upper intermediate wall 1107B so as to extend through the upper intermediate wall 1107B. The plurality of lower shaped apertures 1102B are provided on the lower intermediate wall 1107D so as to extend through the lower intermediate wall 1107D.

Each of the pair of upper bores 1098A are provided in the pultrusion reinforcement 1070 so as to align with a respective upper shaped aperture 1102A. Each of the pair of lower bores 1098B are provided in the pultrusion reinforcement 1070 as to align with a respective lower shaped aperture 1102B.

The plurality of upper slots 1104A are provided so as to extend through a top one of the pair of upper side walls 1107A. The plurality of upper slots 1104A may also be provided so as to extend through a portion of the upper intermediate wall 1107B. In some embodiments, the plurality of upper slots 1104A may extend through the upper intermediate wall 1107B, the top one of the pair of upper side walls 1107A and into the first surface 34.

The plurality of lower slots 1104B are provided so as to extend through a bottom one of the pair of lower side walls 1107C. The plurality of lower slots 1104B may also be provided so as to extend through a portion of the lower intermediate wall 1107D. In some embodiments, the plurality of lower slots 1104B may extend through the lower intermediate wall 1170D, the bottom one of the pair of upper side walls 1107A and into the first surface 34.

The plurality of intermediate slots 1104C are provided so as to extend through the inner wall 1107E. The plurality of intermediate slots 1104C may also be provided so as to extend through the upper intermediate wall 1107B, at least one of a portion of the a bottom one of the pair of upper side walls 1107A, a top one of the pair of lower side walls 1107C, and the lower intermediate wall 1107D. In some embodiments, the plurality of intermediate slots 1104C may extend through the upper intermediate wall 1107B, the bottom one of the pair of upper side walls 1107A, the inner wall 1107E, the top one of the pair of lower side walls 1107C, and the lower intermediate wall 1107D.

In some embodiments, the plurality of upper shaped apertures 1102A and the plurality of lower shaped apertures 1102B are formed having a generally circular shape. It is appreciated that the shape of the plurality of shaped apertures 1102A and the plurality of lower shaped apertures 1102B are not limited to generally circular shapes and may include other regular and non-regular geometric shapes, illustratively including triangles, rhombus, semicircles, and rectangles. It is appreciated, that the plurality of upper shaped apertures 1102A and the plurality of lower shaped apertures 1102B may have the same or different shapes.

The plurality of upper slots 1104A, the plurality of lower slots 1104B, and the plurality of intermediate slots 1104C are provided having an elongated rectangular shape and having ends that are generally semicircular. The plurality of upper slots 1104A, the plurality of lower slots 1104B, and the plurality of intermediate slots 1104C are not limited to elongated generally rectangular shapes having ends that are generally semicircular and may include other regular and non-regular geometric shapes, illustratively including triangles, rhombus, semicircles, and rectangles. It is appreciated, that the plurality of upper slots 1104A, the plurality of lower slots 1104B, and the plurality of intermediate slots 1104C may have the same or different shapes.

In some embodiments, the plurality of upper shaped apertures 1102A and the plurality of lower shaped apertures 1102B are aligned in the vehicle vertical direction such that each of the plurality of upper shaped apertures 1102A is linearly aligned with a respective one of the plurality of lower shaped apertures 1102B. In some embodiments, the plurality of upper slots 1104A, the plurality of lower slots 1104B, and the plurality of intermediate slots 1104C are aligned in the vehicle vertical direction such that each of the plurality of upper slots 1104A is linearly aligned with a respective one of the plurality of lower slots 1104B and a respective one of the plurality of intermediate slots 1104C. In some embodiments, the plurality of upper slots 1104A, the plurality of lower slots 1104B, and the plurality of intermediate slots 1104C are disposed between adjacent upper shaped apertures 1102A and adjacent lower shaped apertures 1102B.

As discussed above, the plurality of openings 1100 allow for the visual inspection of the pultrusion reinforcement 1070 after the seat back frame 1012 has been overmolded onto the pultrusion reinforcement 1070. The plurality of upper shaped apertures 1102A allows for the first upper surface 1090AA of the upper base wall 1090A to be visible through the seat back frame 1012, specifically the first surface 34 of the seat back frame 1012. The plurality of lower shaped apertures 1102B allows for the first lower surface 1090BA of the lower base wall 1090B to be visible through the seat back frame 1012, specifically the first surface 34 of the seat back frame 1012. The plurality of upper slots 1104A allows for the first upper surface 1090AA of the upper base wall 1090A, a first upper surface 1092AA of a top one of the pair of upper side walls 1092A, and the first upper surface 1094AA of the upper flange 1094A to be visible through the seat back frame 1012, specifically the first surface 34 of the seat back frame 1012. The plurality of lower slots 1104B allows for the first lower surface 1090BA of the lower base wall 1090B, a first lower surface 1092BA of a bottom one of the pair of lower side walls 1092B, and the first lower surface 1094BA of the lower flange 1094B to be visible through the seat back frame 1012, specifically the first surface 34 of the seat back frame 1012.

The plurality of intermediate slots 1104C allows for the first upper surface 1090AA of the upper base wall 1090A, the first upper surface 1092AA of the bottom one of the pair of upper side walls 1092A, the first surface 1095A of the center wall 1095, the first lower surface 1092BA of the top one of the pair of lower side walls 1092B, and the first lower surface 1092BA of the lower base wall 1090B to be visible through the seat back frame 1012, specifically the first surface 34 of the seat back frame 1012.

Referring to FIG. 6, the second surface 36 of the seat back frame 1012 is formed with a plurality of openings 1110 positioned such that visual access to the pultrusion reinforcement 1070 is permitted through the second surface 36 of the seat back frame 1012. The plurality of openings 1110 includes a plurality of upper shaped apertures 1112A, a plurality of lower shaped apertures 1112B, a plurality of upper slots 1114A, a plurality of lower slots 1114B, and a plurality of intermediate slots 1114C. The plurality of upper shaped apertures 1112A are provided on the upper intermediate wall 1064B so as to extend through the upper intermediate wall 1064B. The plurality of lower shaped apertures 1112B are provided on the lower intermediate wall 1064D so as to extend through the lower intermediate wall 1064D.

Each of the pair of upper bores 1098A are provided in the pultrusion reinforcement 1070 so as to align with a respective upper shaped aperture 1112A. Each of the pair of lower bores 1098B are provided in the pultrusion reinforcement 1070 so as to align with a respective lower shaped aperture 1112B. As such, the alignment of the pair of upper bores 1098A with the upper shaped apertures 1102A and the upper shaped apertures 1112A allow a channel to be formed through the seat back frame 1012 from the first surface 34 to the second surface 36. Similarly, the alignment of the pair of lower bores 1098B with the lower shaped apertures 1102B and the lower shaped apertures 1112B allow a channel to be formed through the seat back frame 1012 from the first surface 34 to the second surface 36.

The plurality of upper slots 1114A are provided so as to extend through a top one of the pair of upper side walls 1064A. The plurality of upper slots 1114A may also be provided so as to extend through a portion of the upper intermediate wall 1064B. In some embodiments, the plurality of upper slots 1114A may extend through the upper intermediate wall 1064B, the top one of the pair of upper side walls 1064A and into the second surface 36.

The plurality of lower slots 1114B are provided so as to extend through a bottom one of the pair of lower side walls 1064C. The plurality of lower slots 1114B may also be provided so as to extend through a portion of the lower intermediate wall 1064D. In some embodiments, the plurality of lower slots 1114B may extend through the lower intermediate wall 1064D, the bottom one of the pair of upper side walls 1064A and into the second surface 36.

The plurality of intermediate slots 1114C are provided so as to extend through the inner wall 1064E. The plurality of intermediate slots 1114C may also be provided so as to extend through the upper intermediate wall 1064B, at least one of a portion of the a bottom one of the pair of upper side walls 1064A, a top one of the pair of lower side walls 1064C, and the lower intermediate wall 1064D. In some embodiments, the plurality of intermediate slots 1114C may extend through the upper intermediate wall 1064B, the bottom one of the pair of upper side walls 1064A, the inner wall 1064E, the top one of the pair of lower side walls 1064C, and the lower intermediate wall 1064D.

In some embodiments, the plurality of upper shaped apertures 1112A and the plurality of lower shaped apertures 1112B are formed having a generally circular shape. It is appreciated that the shape of the plurality of shaped apertures 1112A and the plurality of lower shaped apertures 1112B are not limited to generally circular shapes and may include other regular and non-regular geometric shapes, illustratively including triangles, rhombus, semicircles, and rectangles. It is appreciated, that the plurality of upper shaped apertures 1112A and the plurality of lower shaped apertures 1112B may have the same or different shapes.

The plurality of upper slots 1117A, the plurality of lower slots 1117B, and the plurality of intermediate slots 1117C are provided having an elongated rectangular shape and having ends that are generally semicircular. It is appreciated that the shape of the plurality of The plurality of upper slots 1117A, the plurality of lower slots 1117B, and the plurality of intermediate slots 1117C are not limited to elongated generally rectangular shapes having ends that are generally semicircular and may include other regular and non-regular geometric shapes, illustratively including triangles, rhombus, semicircles, and rectangles. It is appreciated, that the plurality of upper slots 1117A, the plurality of lower slots 1117B, and the plurality of intermediate slots 1117C may have the same or different shapes.

In some embodiments, the plurality of upper shaped apertures 1112A and the plurality of lower shaped apertures 1112B are aligned in the vehicle vertical direction such that each of the plurality of upper shaped apertures 1112A is linearly aligned with a respective one of the plurality of lower shaped apertures 1112B. In some embodiments, the plurality of upper slots 1114A, the plurality of lower slots 1114B, and the plurality of intermediate slots 1114C are aligned in the vehicle vertical direction such that each of the plurality of upper slots 1114A is linearly aligned with a respective one of the plurality of lower slots 1114B and a respective one of the plurality of intermediate slots 1114C. In some embodiments, the plurality of upper slots 1114A, the plurality of lower slots 1114B, and the plurality of intermediate slots 1114C are disposed between adjacent upper shaped apertures 1112A and adjacent lower shaped apertures 1112B.

In some embodiments, the plurality of openings 1100 and the plurality of openings 1110 are provided to be on corresponding portions of the first surface 34 and the second surface 36. It is appreciated, that the position of the plurality of openings 1100 on the first surface 34 may not correspond to the position of the plurality of openings 1110 on the second surface 36.

As discussed above, the plurality of openings 1110 allow for the visual inspection of the pultrusion reinforcement 1070 after the seat back frame 1012 has been overmolded onto the pultrusion reinforcement 1070. The plurality of upper shaped apertures 1112A allows for the second upper surface 1090AB of the upper base wall 1090A to be visible through the seat back frame 1012, specifically the second surface 36 of the seat back frame 1012. The plurality of lower shaped apertures 1112B allows for the second lower surface 1090BB of the lower base wall 1090B to be visible through the seat back frame 1012, specifically the second surface 36 of the seat back frame 1012. The plurality of upper slots 1114A allows for the second upper surface 1090AB of the upper base wall 1090A, a second upper surface 1092AB of a top one of the pair of upper side walls 1092A, and the second upper surface 1094AB of the upper flange 1094A to be visible through the seat back frame 1012, specifically the second surface 36 of the seat back frame 1012. The plurality of lower slots 1114B allows for the second lower surface 1090BB of the lower base wall 1090B, a second lower surface 1092BB of a bottom one of the pair of lower side walls 1092B, and the second lower surface 1094BB of the lower flange 1094B to be visible through the seat back frame 1012, specifically the second surface 36 of the seat back frame 1012.

The plurality of intermediate slots 1114C allows for the second upper surface 1090AB of the upper base wall 1090A, the second upper surface 1092AB of the bottom one of the pair of upper side walls 1092A, the second surface 1095B of the center wall 1095, the second lower surface 1092BB of the top one of the pair of lower side walls 1092B, and the second lower surface 1092BB of the lower base wall 1090B to be visible through the seat back frame 1012, specifically the second surface of the seat back frame 1012.

In various embodiments and as shown in FIG. 7, the bracket 15 may be positioned adjacent (i.e., proximate or near) the pultrusion reinforcement 1070 and may be configured to pivotally couple the side member 30 to the seat cushion frame 14 using a fastening member 99 (e.g., a rotatable fastening nut, a pivot bolt, a hinge, or other fastening element of the like).

With reference to FIGS. 5, 6A-6B, 7, and 8, an example process of forming the pultrusion reinforcement 1070 and the seat back frame 1012 having the pultrusion reinforcement 1070 will now be described. As described above, the pultrusion reinforcement 1070 may be formed during a pultrusion process. As a non-limiting example, the pultrusion process may include spooling one or more continuous glass fibers using a tension roller. The one or more continuous glass fibers may then be placed in a resin bath (e.g., a polyester, polyurethane, vinylester, epoxy, etc.), and the resin may permeate the one or more continuous glass fibers. In some embodiments, pigments and catalysts that enhance the curing of the pultrusion reinforcement 1070 may be added while the one or more continuous glass fibers are within the resin bath. Subsequently, the mixture of the one or more continuous glass fibers and the resin may be provided to a heat source, such as a steel-forming die, in order to polymerize the resin. The polymerized resin and one or more continuous glass fibers are removed from the heat source as a solid fiberglass reinforced polymer. It should be understood that the pultrusion reinforcement 1070 may be formed using any suitable pultrusion process or other suitable manufacturing process in other embodiments.

During the pultrusion process, various geometric characteristics of the pultrusion reinforcement 1070 may be defined. As a non-limiting example and as shown in the illustrated embodiments of FIGS. 7 and 8, the pultrusion reinforcement 1070 may be formed in a generally double hat shape and including include the upper base wall 1090, the pair of upper side walls 1092, the upper flange 1094A, the center wall 1095, the lower base wall 1090B, the pair of lower side walls 1092B, and the lower flange 1094B.

Once the pultrusion reinforcement 1070 is formed, the pultrusion reinforcement 1070 is only partially overmolded within the seat back frame 1012 such that the pultrusion reinforcement 1070 is configured to be visually inspected through the seat back frame 1012 through the plurality of openings 1100 and plurality of openings 1110. In some embodiments and with reference to FIG. 8, the pultrusion reinforcement 1070 is placed into an overmold chamber 1120. As a non-limiting example, the pultrusion reinforcement 1070 may be positioned between a first molding substrate 1130 and a second molding substrate 1140 of the overmold chamber 1120.

In some embodiments, at least one of the first molding substrate 1130 and the second molding substrate 1140 may each include a pair of upper pin bores 1181A and a pair of lower pin bores 1181B. The pair of upper pin bores 1181A are configured to receive a pair of upper locating pins 1180A (e.g., a two-way locating pin and a four-way locating pin), and the pair of upper bores 1098A of the pultrusion reinforcement 1070 may be aligned with the pair of upper locating pins 1180A. The pair of lower pin bores 1181B are configured to receive a pair of lower locating pins 1180B (e.g., a two-way locating pin and a four-way locating pin), and the pair of lower bores 1098B of the pultrusion reinforcement 1070 may be aligned with the pair of lower locating pins 1180B.

As shown in FIG. 8, the upper locating pins 1180A are aligned with and extend into the upper bores 1098A of the pultrusion reinforcement 1070 such that ends of the upper locating pins 1180A contact portions of the second molding substrate 1140 upon closing of the overmold chamber 1120. Similarly, the lower locating pins 1180B are aligned with and extend into the lower bores 1098B of the pultrusion reinforcement 1070 such that ends of the lower locating pins 1180B contact portions of the second molding substrate 1140 upon closing of the overmold chamber 1120. The second molding substrate 1140 may include upper bores 1182A that are configured to receive the upper locating pins 1180A and lower bores 1182B that are configured to receive the lower locating pins 1180B. In some embodiments, the upper bores 1182A and the lower bores 1182B are bottomed cavities and in some other embodiments, the upper bores 1182A and the lower bores 1182B are throughbores that extends through the second molding substrate 1140.

Accordingly, the engagement between the pair of upper bores 1098A and the upper locating pins 1180A and the engagement between the pair of lower bores 1098B and the lower locating pins 1180B retain the pultrusion reinforcement 1070 in a predetermined position with respect to the overmold chamber 1120 as the seat back frame 1012 is overmolded onto the pultrusion reinforcement 1070. Once the pultrusion reinforcement 1070 is positioned between the first molding substrate 1130 and the second molding substrate 1140 and retained in position by the pair of upper locating pins 1180A and the pair of lower locating pins 1180B, the overmold chamber 1120 is sealed and isolated from an environment external to the overmold chamber 1120.

Subsequently, an injection molding material may be provided within the overmold chamber 1120. As a non-limiting example, the injection molding material may be a nylon, polyester, polyurethane, vinyl, vinyl ester, and/or epoxy, or other any other suitable injection molding material. In some embodiments, an additive material (e.g., plasticizers, fibers, flame-retardants, colorants, etc.) may be heated and inserted into the overmold chamber 1120 along with the injection molding material.

In some embodiments, the overmold chamber 1120 defines a cavity between the first molding substrate 1130 and the second molding substrate 1140, in which the pultrusion reinforcement 1070 is positioned during the overmold process. Each of the first molding substrate 1130 and the second molding substrate 140 may have a geometry such that when the injection molding material in the overmold chamber 1120 is cured, the pultrusion reinforcement 170 is positioned between the first surface 34 and the second surface 36 of the seat back frame 1012.

In some embodiments, the first molding substrate 1130 may have a geometry such that when the injection molding material in the overmold chamber 1120 is cured, the plurality of upper shaped apertures 1102A, the plurality of lower shaped apertures 1102B, the plurality of upper slots 1104A, the plurality of lower slots 1104B, and the plurality of intermediate slots 1104C are formed in the first surface 34 of the seat back frame 1012.

In some embodiments, the second molding substrate 1140 may have a geometry such that when the injection molding material in the overmold chamber 1120 is cured, the plurality of upper reinforcement ribs 1066A and the plurality of lower reinforcement ribs 1066B are formed in the upper reinforcement recess 1062A and the lower reinforcement recess 1062B, respectively, of the seat back frame 1012. The second molding substrate 1140 may have a geometry such that when injection molding material in the overmold chamber 1120 is cured, the plurality of upper shaped apertures 1112A, the plurality of lower shaped apertures 1112B, the plurality of upper slots 1114A, the plurality of lower slots 1114B, and the plurality of intermediate slots 1114C are formed in the second surface 36 of the seat back frame 1012

Still referring to FIG. 8, the first molding substrate 1130 may include a plurality of projections 1150 (e.g., a plurality of aperture projections and a plurality of slot projections) extending from a mold surface of the first molding substrate 1130 to form the plurality of upper shaped apertures 1102A, the plurality of lower shaped apertures 1102B, the plurality of upper slots 1104A, the plurality of lower slots 1104B, and the plurality of intermediate slots 1104C. The plurality of aperture projections 1150 may directly contact the first upper surface 1090AA of the upper base wall 1090A and may directly contact the first lower surface 1090BA of the lower base wall 1090B of the pultrusion reinforcement 1070 during the overmold process and may have a shape that corresponds to the shape of the plurality of upper shaped apertures 1102A and the plurality of lower shaped apertures 1102B. The plurality of slot projections 1150 may directly contact the first upper surface 1090AA of the upper base wall 1090A, the first upper surface 1092AA of the pair of upper side walls 1092A, the first upper surface 1094AA of the upper flange 1094A, the first surface 1095A of the center wall 1095, the first lower surface 1090BA of the lower base wall 1090B, the first lower surface 1092BA of the pair of lower side walls 1092B, the first lower surface 1094BA of the lower flange 1094B and may have a shape that corresponds to the shape of the plurality of upper slots 1104A, the plurality of lower slots 1104B, and the plurality of intermediate slots 1104C.

Accordingly, when the injection molding material is added into the overmold chamber 1120, the injection molding material is not positioned between the first upper surface 1090AA of the upper base wall 1090A, the first lower surface 1090BA of the lower base wall 1090B, and the aperture projections 1150 so as to form the plurality of upper shaped apertures 1102A and the plurality of lower shaped apertures 1102B. Similarly, when the injection molding material is added into the overmold chamber 1120, the injection molding material is not positioned between the first upper surface 1090AA of the upper base wall 1090A, the first upper surface 1092AA of the pair of upper side walls 1092A, the first upper surface 1094AA of the upper flange 1094A, the first surface 1095A of the center wall 1095, the first lower surface 1090BA of the lower base wall 1090B, the first lower surface 1092BA of the pair of lower side walls 1092B, the first lower surface 1094BA of the lower flange 1094B, and the slot projections 1150 so as to form the plurality of upper slots 1104A, the plurality of lower slots 1104B, and the plurality of intermediate slots 1104C.

Therefore, when the injection molding material in the overmold chamber 1120 is cured, the plurality of upper shaped apertures 1102A, the plurality of lower shaped apertures 1102B, the plurality of upper slots 1104A, the plurality of lower slots 1104B, the plurality of intermediate slots 1104C of the plurality of openings 1100 are formed in the first surface 34 of the seat back frame 1012 such that the pultrusion reinforcement 1070 is configured to be visually inspected through the seat back frame 1012.

Still referring to FIG. 8, the second molding substrate 1140 may include a plurality of projections 1160 (e.g., a plurality of aperture projections and a plurality of slot projections) extending from a mold surface of the second molding substrate 1140 to form the plurality of upper shaped apertures 1112A, the plurality of lower shaped apertures 1112B, the plurality of the upper slots 1114A, the plurality of lower slots 1114B, and the plurality of intermediate slots 1114C. The plurality of aperture projections 1160 may directly contact the second upper surface 1090AB of the upper base wall 1090A and may directly contact the second lower surface 1090BB of the lower base wall 1090B of the pultrusion reinforcement 1070 during the overmold process and may have a shape that corresponds to the shape of the plurality of upper shaped apertures 1112A and the plurality of lower shaped apertures 1112B. The plurality of slot projections 1160 may directly contact the second upper surface 1090AB of the upper base wall 1090A, the second upper surface 1092AB of the pair of upper side walls 1092A, the second upper surface 1094AB of the upper flange 1094A, the second surface 1095B of the center wall 1095, the second lower surface 1090BB of the lower base wall 1090B, the second lower surface 1092BB of the pair of lower side walls 1092B, the second lower surface 1094BB of the lower flange 1094B and may have a shape that corresponds to the shape of the plurality of upper slots 1114A, the plurality of lower slots 1114B, and the plurality of intermediate slots 1114C.

Accordingly, when the injection molding material is added into the overmold chamber 1120, the injection molding material is not positioned between the second upper surface 1090AB of the upper base wall 1090A, the second lower surface 1090BB of the lower base wall 1090B, and the aperture projections 1160 so as to form the plurality of upper shaped apertures 1112A and the plurality of lower shaped apertures 1112B. Similarly, when the injection molding material is added into the overmold chamber 1120, the injection molding material is not positioned between the second upper surface 1090AB of the upper base wall 1090A, the second upper surface 1092AB of the pair of upper side walls 1092A, the second upper surface 1094AB of the upper flange 1094A, the second surface 1095B of the center wall 1095, the second lower surface 1090BB of the lower base wall 1090B, the second lower surface 1092BB of the pair of lower side walls 1092B, the second lower surface 1094BB of the lower flange 1094B, and the slot projections 1160 so as to form the plurality of upper slots 1114A, the plurality of lower slots 1114B, and the plurality of intermediate slots 1114C.

Therefore, when the injection molding material in the overmold chamber 1120 is cured, the plurality of upper shaped apertures 1112A, the plurality of lower shaped apertures 1112B, the plurality of upper slots 1114A, the plurality of lower slots 1114B, the plurality of intermediate slots 1114C of the plurality of openings 1110 are formed in the second surface 36 of the seat back frame 1012 such that the pultrusion reinforcement 1070 is configured to be visually inspected through the seat back frame 1012.

It is appreciated that the second molding substrate 1140 may each have a shape that corresponds to the shape of the plurality of upper reinforcement ribs 1066A and the plurality of lower reinforcement ribs 1066B. Accordingly, when the injection molding material in the overmold chamber 1120 is cured, the plurality of upper reinforcement ribs 1066A and the plurality of lower reinforcement ribs 1066B are formed in the second surface 36 of the seat back frame 1012.

It should now be understood that vehicles according to the present disclosure include seat assemblies 1010 including a seat back frame 1012 and a seat cushion frame 14. In embodiments, the seat back frame 1012 includes the plurality of openings 1100 on the first surface 34 and the plurality of openings 1110 on the second surface 36 of the pultrusion reinforcement 1070 that are formed during the overmold process. Accordingly, seat back frame 1012 is configured to enable visual inspection of the pultrusion reinforcement 1070 after the overmold process is completed, thereby enabling an operator to verify that the pultrusion reinforcement 1070 is properly positioned and undamaged upon completion of the overmold process, thereby enabling visual inspection of the pultrusion reinforcement 1070 after the overmold process is completed. Moreover, pultrusion reinforcement 1070 includes the plurality of upper reinforcement ribs 1066A and the plurality of lower reinforcement ribs 1066B are formed in the upper reinforcement recess 1062A and the lower reinforcement recess 1062B, respectively, of the seat back frame 1012 during the overmold process. Accordingly, the plurality of upper reinforcement ribs 1066A and the plurality of lower reinforcement ribs 1066B may provide rigidity against a torsion force applied to the seat back frame 1012.

Accordingly, a method of forming the seat back assembly 1010 includes providing the pultrusion reinforcement 1070, overmolding the seat back frame 1012 onto the pultrusion reinforcement 1070, and forming the plurality of openings 1100 and the plurality of openings 1110 in the seat back frame 1012 when overmolding the seat back frame 1012 onto the pultrusion reinforcement 1070 such that the pultrusion reinforcement 1070 is configured to be visually inspected through the plurality of openings 1100 and the plurality of openings 1110.

The method also includes the step of forming the plurality of openings 1100 on a first surface 34 of the seat back frame 1012. The plurality of openings 1100 includes the plurality of upper shaped apertures 1102A, the plurality of lower shaped apertures 1102B, the plurality of upper slots 1104A, the plurality of lower slots 1104B, and the plurality of intermediate slots 1104C. The method also includes the step of forming the plurality of openings 1110 on the second surface 36 of the seat back frame 1012. The plurality of openings 1110 includes the plurality of upper shaped apertures 1112A, the plurality of lower shaped apertures 1112B, the plurality of upper slots 1114A, the plurality of lower slots 1114B, and the plurality of intermediate slots 1114C. The method also includes the step of forming the plurality of upper reinforcement ribs 1066A and the plurality of lower reinforcement ribs 1066B in the second surface 36 of the seat back frame 1012.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Spatial and functional relationships between members are described herein using various terms, including "connected," "engaged," "coupled," "adjacent," "proximate," "next to," "on top of," "above," "below," "positioned," and "disposed." Unless explicitly described as being "direct," when a relationship between first and second members is described in the above disclosure, that relationship can be a direct relationship where no other intervening members are present between the first and second members, but can also be an indirect relationship where one or more intervening members are present (either spatially or functionally) between the first and second members While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat back assembly comprising:
    a pultrusion reinforcement having a generally hat shape formed by a base wall, a pair of side walls that extend from side edges of the base wall, and a pair of flanges that extend from side edges of the pair of side walls; and
    a seat back frame formed of a resin material, the seat back frame is only partially overmolded onto the pultrusion reinforcement such that the pultrusion reinforcement is configured to be visually inspected through a plurality of apertures and a plurality of slots formed in the seat back frame.

2. The seat back assembly of claim 1, wherein the pultrusion reinforcement is formed of a continuous glass fiber reinforced resin material.

3. The seat back assembly of claim 1, wherein the plurality of apertures are formed in the seat back frame such that a portion of the base wall of the pultrusion reinforcement is configured to be visually inspected through the plurality of apertures,
    wherein the plurality of apertures are formed in the seat back frame such that a portion of at least one of the pair of side walls is configured to be visually inspected through the plurality of apertures.

4. The seat back assembly of claim 3, wherein the seat back frame includes a first surface and an opposite second surface and the pultrusion reinforcement is positioned between the first surface and the second surface of the seat back frame, and
    wherein the plurality of apertures and the plurality of slots are formed in both the first surface and the second surface.

5. The seat back assembly of claim 4, wherein the second surface of the seat back frame includes a plurality of reinforcement ribs that extend along a plurality of link portions formed in the second surface of the seat back frame, the plurality of link portions define the plurality of apertures formed in the second surface of the seat back frame.

6. A seat back assembly comprising:
    a pultrusion reinforcement having a generally double hat shape formed by an upper flange, an upper base wall, a center wall, a first upper side wall extending between the upper flange and the upper base wall, a second upper side wall extend between the upper base wall and the center wall, a lower base wall, a lower flange, a first lower side wall that extends between the center wall and the lower base wall, and a second lower side wall that extends between the lower base wall and the lower flange; and
    a seat back frame formed of a resin material, the seat back frame is only partially overmolded onto the pultrusion reinforcement such that the pultrusion reinforcement is configured to be visually inspected through a plurality of openings formed in the seat back frame.

7. The seat back assembly of claim 6, wherein the plurality of openings includes a plurality of upper apertures, a plurality of lower apertures, a plurality of upper slots, a plurality of lower slots, and a plurality of intermediate slots,
    wherein the plurality of upper apertures are formed in the seat back frame such that a portion of the upper base wall of the pultrusion reinforcement is configured to be visually inspected through the plurality of upper apertures,
    wherein the plurality of lower aperture are formed in the seat back frame such that a portion of the lower base wall of the pultrusion reinforcement is configured to be visually inspected through the plurality of lower apertures,
    wherein the plurality of upper slots are formed in the seat back frame such that at least a portion of the first upper side wall of the pultrusion reinforcement is configured to be visually inspected through the plurality of upper slots,
    wherein the plurality of lower slots are formed in the seat back frame such that at least a portion of the first lower side wall of the pultrusion reinforcement is configured to be visually inspected through the plurality of lower slots, and
    wherein the plurality of intermediate slots are formed in the seat back frame such that at least a portion of the center wall of the pultrusion reinforcement is configured to be visually inspected through the plurality of intermediate slots.

8. The seat back assembly of claim 7, wherein the seat back frame includes a plurality of upper reinforcement ribs and a plurality of lower reinforcement ribs, the plurality of upper reinforcement ribs are configured to be positioned between the first upper side wall and the second upper side wall of the pultrusion reinforcement, and the plurality of lower reinforcement ribs are configured to be positioned between the first lower side wall and the second lower side wall of the pultrusion reinforcement.

9. A seat assembly comprising:
    a seat cushion frame;
    a pultrusion reinforcement having at least one generally hat shape formed by a base wall, a pair of side walls that extend from side edges of the base wall, and a pair of flanges that extend from side edges of the pair of side walls; and a seat back frame formed of a resin material, the seat back frame is only partially overmolded onto the pultrusion reinforcement such that the pultrusion reinforcement is configured to be visually inspected through a plurality of apertures and a plurality of slots formed in the seat back frame.

10. The seat assembly of claim 9, wherein the pultrusion reinforcement is formed a continuous glass fiber reinforced resin material.

11. The seat assembly of claim 9, wherein the plurality of apertures are formed in the seat back frame such that a portion of the base wall of the pultrusion reinforcement is configured to be visually inspected through the plurality of apertures, wherein the plurality of apertures are formed in the seat back frame such that a portion of at least one of the pair of side walls is configured to be visually inspected through the plurality of apertures.

12. The seat assembly of claim 11, wherein the seat back frame includes a first surface and an opposite second surface and the pultrusion reinforcement is positioned between the first surface and the second surface of the seat back frame, and wherein the plurality of apertures and the plurality of slots are formed in both the first surface and the second surface.

13. The seat assembly of claim 12, wherein the second surface of the seat back frame includes a plurality of reinforcement ribs that extend along a plurality of link portions formed in the second surface of the seat back frame, the plurality of link portions to define the plurality of apertures formed in the second surface of the seat back frame.

14. The seat assembly of claim 9, wherein the at least one generally hat shape of the pultrusion reinforcement is a generally double hat shape, wherein the pair of flanges includes an upper flange and a center wall, and the pair of side walls includes a first upper side wall and a second upper side wall, wherein the generally double hat shape is formed by the base wall, the center wall, the first upper side wall extending between the upper flange and the base wall, the second upper side wall extending between the base wall and the center wall, a lower base wall, a lower flange, a first lower side wall that extends between the center wall and the lower base wall, and a second lower side wall that extends between the lower base wall and the lower flange.

15. The seat assembly of claim 14, wherein the plurality of openings includes a plurality of upper apertures, a plurality of lower apertures, a plurality of upper slots, a plurality of lower slots, and a plurality of intermediate slots, wherein the plurality of upper apertures are formed in the seat back frame such that a portion of the base wall of the pultrusion reinforcement is configured to be visually inspected through the plurality of upper apertures, wherein the plurality of lower aperture are formed in the seat back frame such that a portion of the lower base wall of the pultrusion reinforcement is configured to be visually inspected through the plurality of lower apertures, wherein the plurality of upper slots are formed in the seat back frame such that at least a portion of the first upper side wall of the pultrusion reinforcement is configured to be visually inspected through the plurality of upper slots, wherein the plurality of lower slots are formed in the seat back frame such that at least a portion of the first lower side wall of the pultrusion reinforcement is configured to be visually inspected through the plurality of lower slots, and wherein the plurality of intermediate slots are formed in the seat back frame such that at least a portion of the center wall of the pultrusion reinforcement is configured to be visually inspected through the plurality of intermediate slots.

16. The seat assembly of claim 15, wherein the seat back frame includes a plurality of upper reinforcement ribs and a plurality of lower reinforcement ribs, the plurality of upper reinforcement ribs are configured to be positioned between the first upper side wall and the second upper side wall of the pultrusion reinforcement, and the plurality of lower reinforcement ribs are configured to be positioned between the first lower side wall and the second lower side wall of the pultrusion reinforcement.

* * * * *

UNITED STATES PATENT AND TRADEMARK OFFICE
CERTIFICATE OF CORRECTION

| | | |
|---|---|---|
| PATENT NO. | : 12,168,405 B2 | Page 1 of 1 |
| APPLICATION NO. | : 17/571147 | |
| DATED | : December 17, 2024 | |
| INVENTOR(S) | : Jacob A. Herget et al. | |

It is certified that error appears in the above-identified patent and that said Letters Patent is hereby corrected as shown below:

In the Specification

In Column 10, Line(s) 27, before "include", delete "including".

In Column 13, Line(s) 32 & 33, delete "area coupled the seat back frame 1012 a fastener", insert --are coupled to the seat back frame 1012 with a fastener--, therefor.

In Column 19, Line(s) 11, before "bottom", delete "a".

In Column 21, Line(s) 7, before "bottom", delete "a".

In Column 22, Line(s) 66, before "include", delete "including".

Signed and Sealed this
Fourth Day of February, 2025

Coke Morgan Stewart
*Acting Director of the United States Patent and Trademark Office*